(12) United States Patent
Deal et al.

(10) Patent No.: US 8,212,522 B2
(45) Date of Patent: Jul. 3, 2012

(54) ENERGY STORAGE MODULE

(76) Inventors: Larry L. Deal, Shelby Township, MI (US); Gary J. Gloceri, Waterford, MI (US); Adam G. Sciriha, Mount Clemens, MI (US); Todd A. Kendall, Macomb, MI (US); Wayne B. Uhrick, Macomb, MI (US); Phillip Piatkowski, Jr., Madison Heights, MI (US); Leah M. Piatkowski, legal representative, Bay City, MI (US); Sarwar Islam, Detroit, MI (US); Ladislau M. Mako, Brasov (RO); Theodore L. Hoag, Royal Oak, MI (US)

( * ) Notice: Subject to any disclaimer, the term of this patent is extended or adjusted under 35 U.S.C. 154(b) by 443 days.

(21) Appl. No.: 12/370,165

(22) Filed: Feb. 12, 2009
(Under 37 CFR 1.47)

(65) Prior Publication Data
US 2010/0141208 A1 Jun. 10, 2010

Related U.S. Application Data

(60) Provisional application No. 61/028,165, filed on Feb. 12, 2008.

(51) Int. Cl.
*H02J 7/00* (2006.01)
*H02J 7/16* (2006.01)
*H01M 2/10* (2006.01)

(52) U.S. Cl. ........ 320/116; 320/107; 320/112; 320/117; 320/118; 320/119; 320/120; 320/121; 320/122; 320/150; 320/151; 429/96; 429/97; 429/98; 429/99; 429/100; 429/122; 429/123; 429/140; 429/151; 429/152; 429/163; 429/164

(58) Field of Classification Search .................. 320/116
See application file for complete search history.

(56) References Cited

U.S. PATENT DOCUMENTS

| | | | | |
|---|---|---|---|---|
| 6,344,728 B1* | 2/2002 | Kouzu et al. | ................. | 320/116 |
| 7,304,453 B2* | 12/2007 | Eaves | ............................ | 320/120 |
| 7,400,113 B2* | 7/2008 | Osborne | ....................... | 320/118 |
| 7,604,896 B2* | 10/2009 | Maguire et al. | ............... | 429/160 |
| 7,777,451 B2* | 8/2010 | Chang et al. | .................. | 320/118 |
| 7,782,013 B2* | 8/2010 | Chang | ............................ | 320/116 |
| 7,807,290 B2* | 10/2010 | Saiki | ............................. | 429/160 |
| 2002/0043959 A1* | 4/2002 | Tanaka et al. | ................... | 320/116 |
| 2003/0193313 A1* | 10/2003 | Takedomi et al. | ............ | 320/107 |
| 2006/0028170 A1* | 2/2006 | Izawa | ............................ | 320/107 |
| 2006/0028183 A1* | 2/2006 | Izawa et al. | .................... | 320/150 |
| 2007/0080664 A1* | 4/2007 | Maguire et al. | ............... | 320/116 |
| 2007/0170889 A1* | 7/2007 | Ishikawa et al. | .............. | 320/116 |
| 2008/0090139 A1* | 4/2008 | Hurst et al. | .................... | 429/156 |
| 2009/0066291 A1* | 3/2009 | Tien et al. | ...................... | 320/118 |
| 2009/0235972 A1* | 9/2009 | Fukushima et al. | .......... | 136/244 |
| 2010/0112424 A1* | 5/2010 | Hayashi | ......................... | 429/99 |

* cited by examiner

*Primary Examiner* — Patrick Assouad
*Assistant Examiner* — Nathaniel Pelton
(74) *Attorney, Agent, or Firm* — Magna International Inc.

(57) ABSTRACT

A battery assembly having batteries connected in series to form rows and columns of battery cells into packs that combine the energy of multiple batteries. The battery cells are joined together to form columns of cells connected mechanically together by an exterior connection sleeve, and mechanically and electrically connected together by a conductive epoxy joining the end of one cell to the end of an adjacent cell in series. The columns of cells are mounted and held in place by racks, with bolts passing through the racks to form a sandwich structure that secures the position and orientation of the cells and columns, and that maintains the electrical connection between joined cells. Perpendicularly disposed to the direction of the columns are a series of conductive bands that join adjacent cells together along rows of cells.

3 Claims, 24 Drawing Sheets

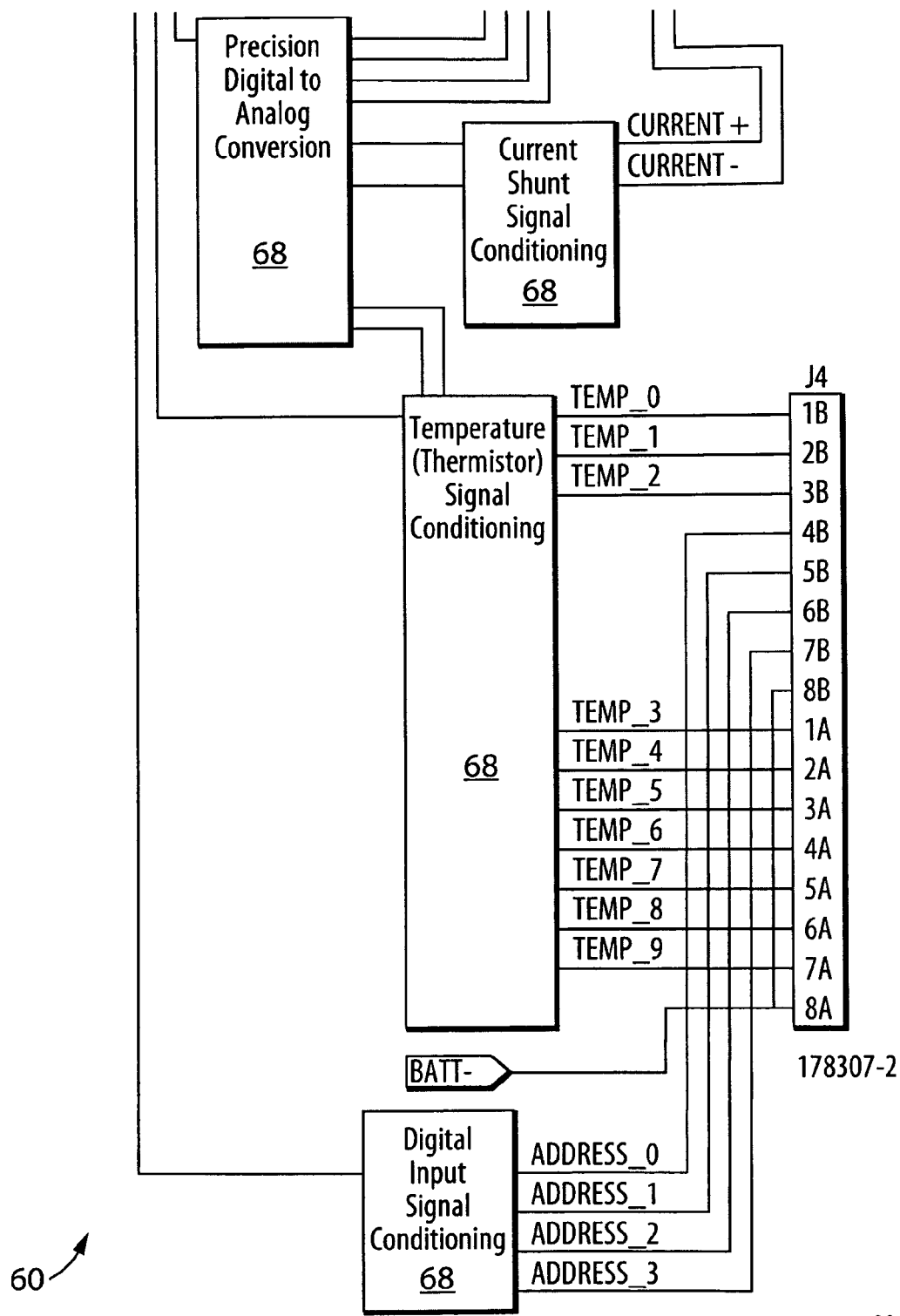
FIG. 11 (ii)

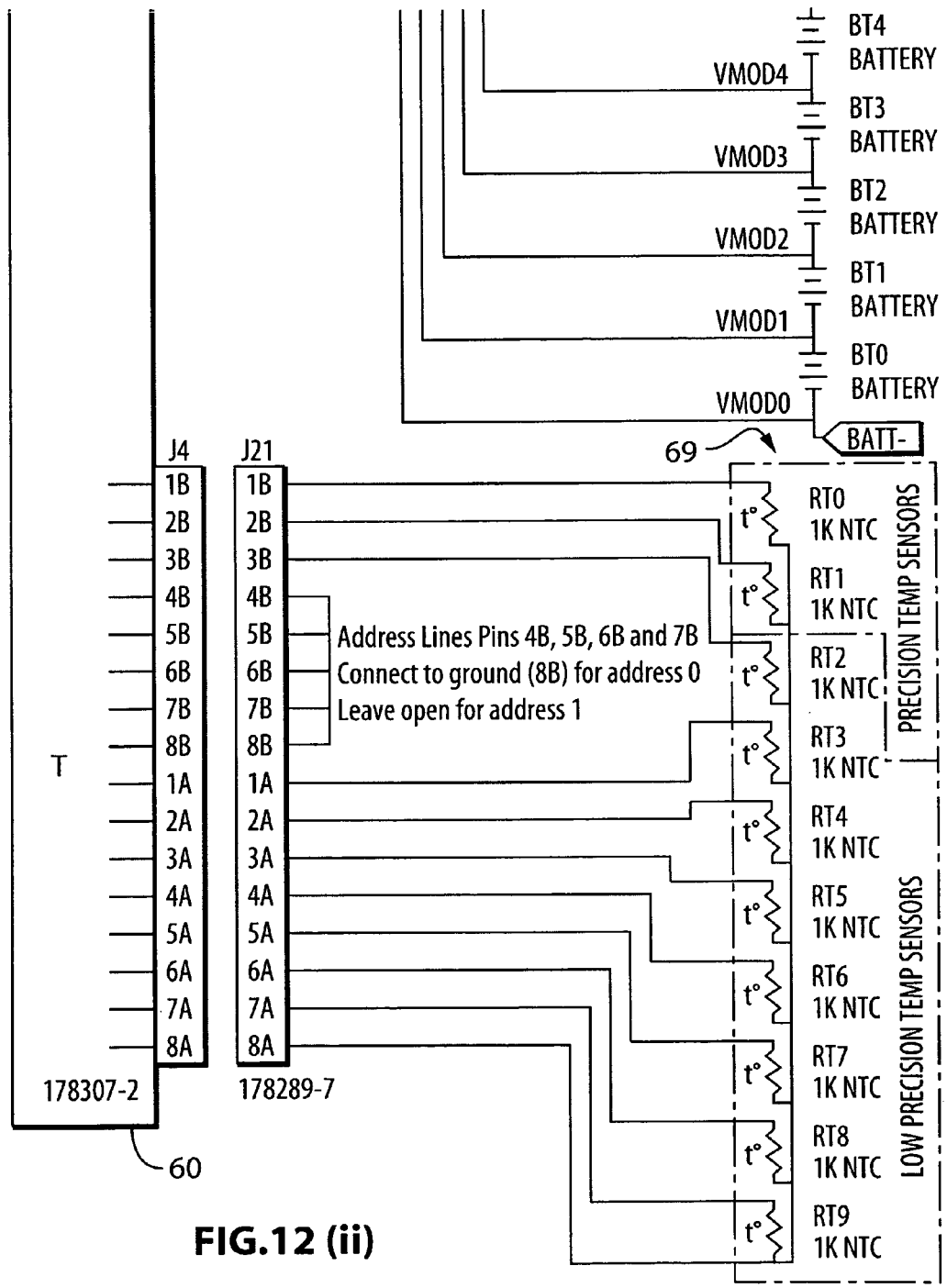
FIG.12 (ii)

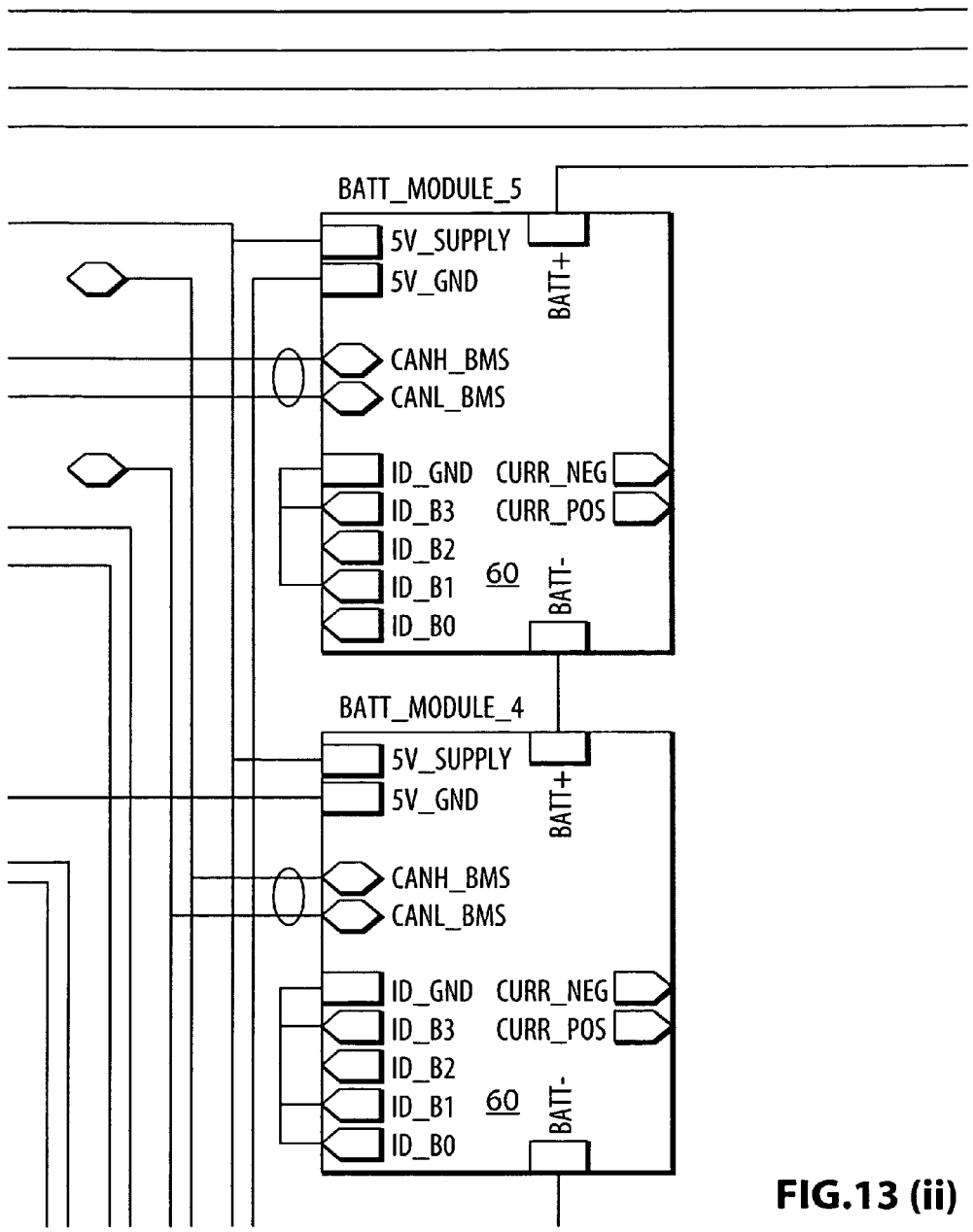
FIG.13 (ii)

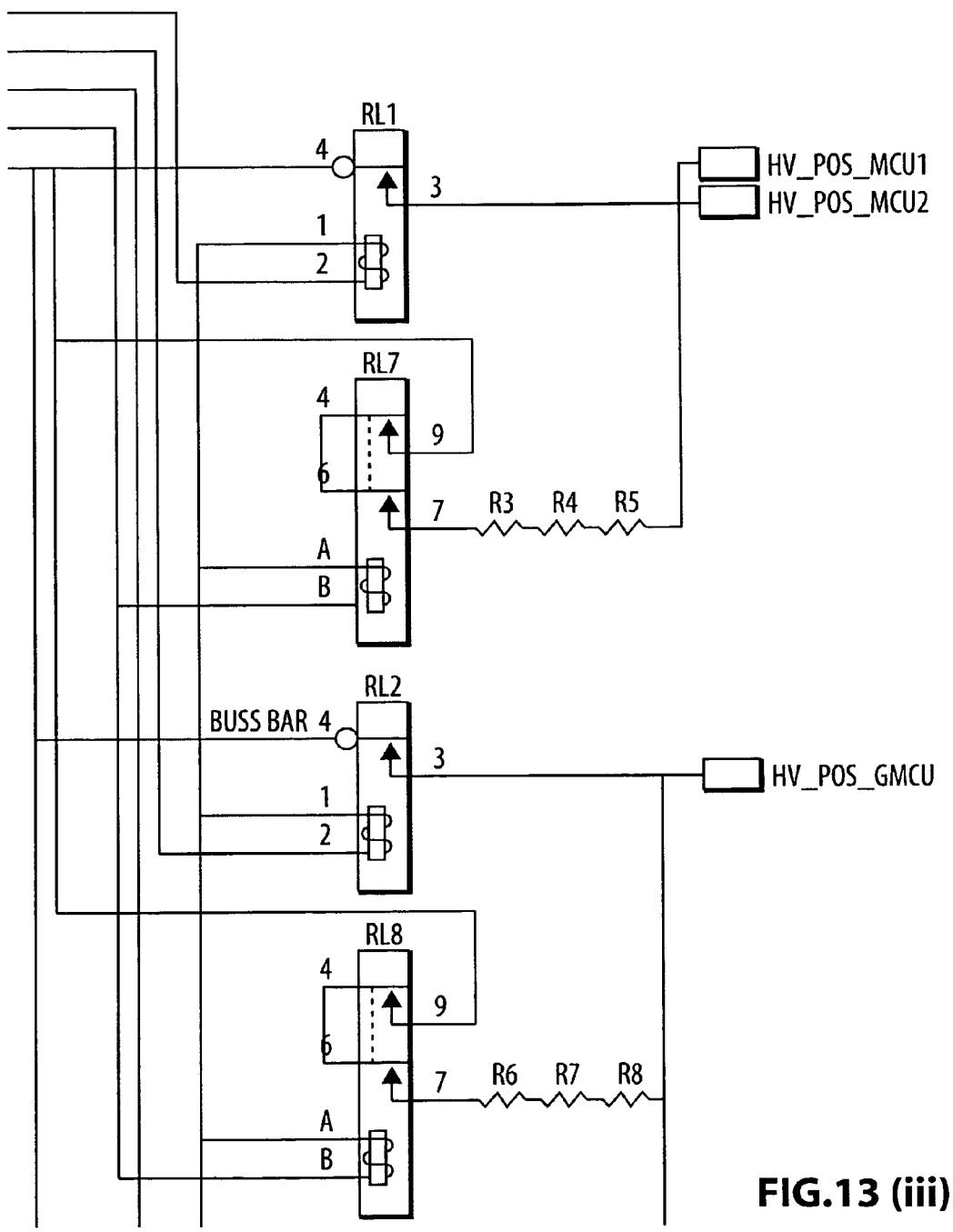
FIG.13 (iii)

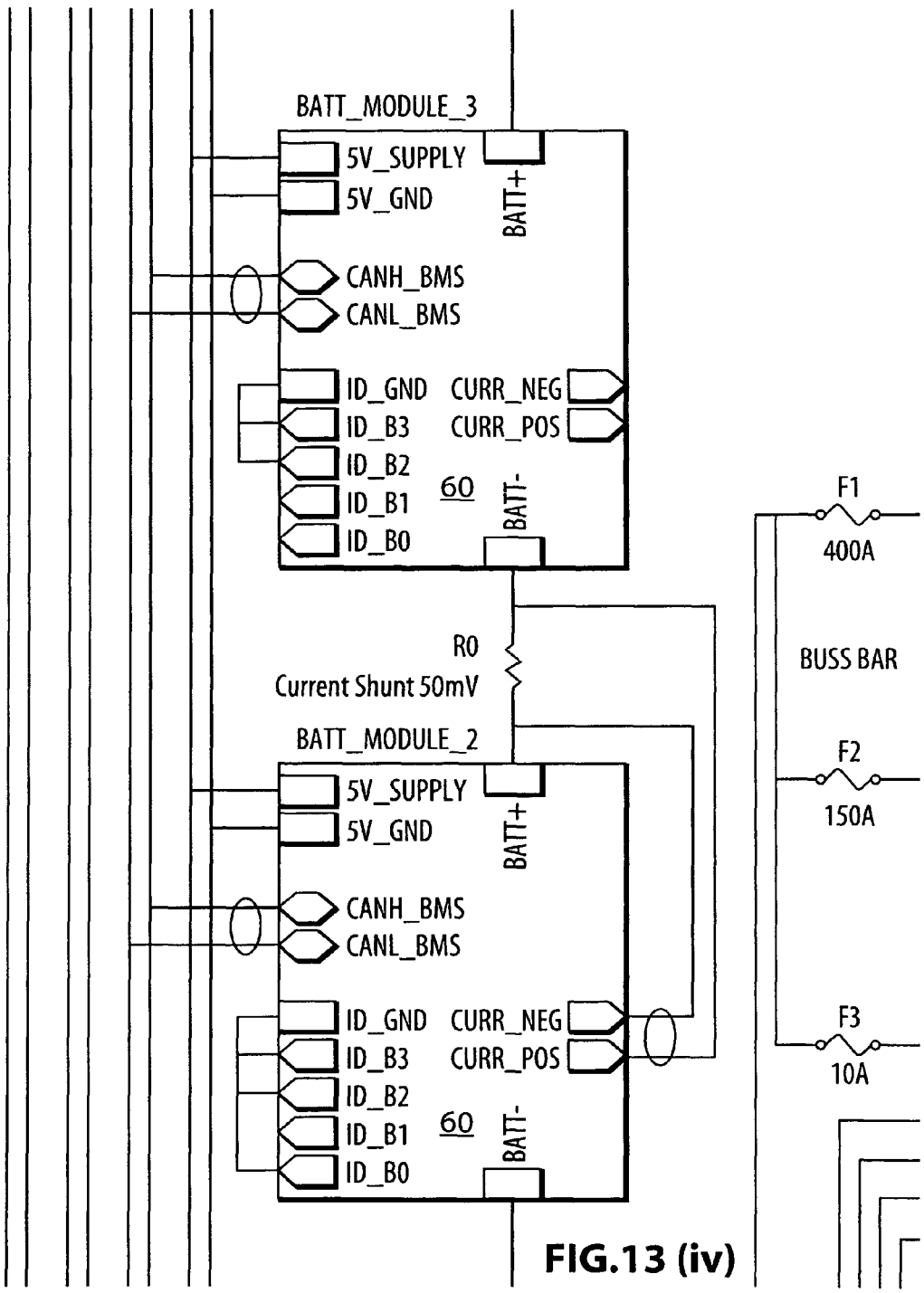
FIG.13 (iv)

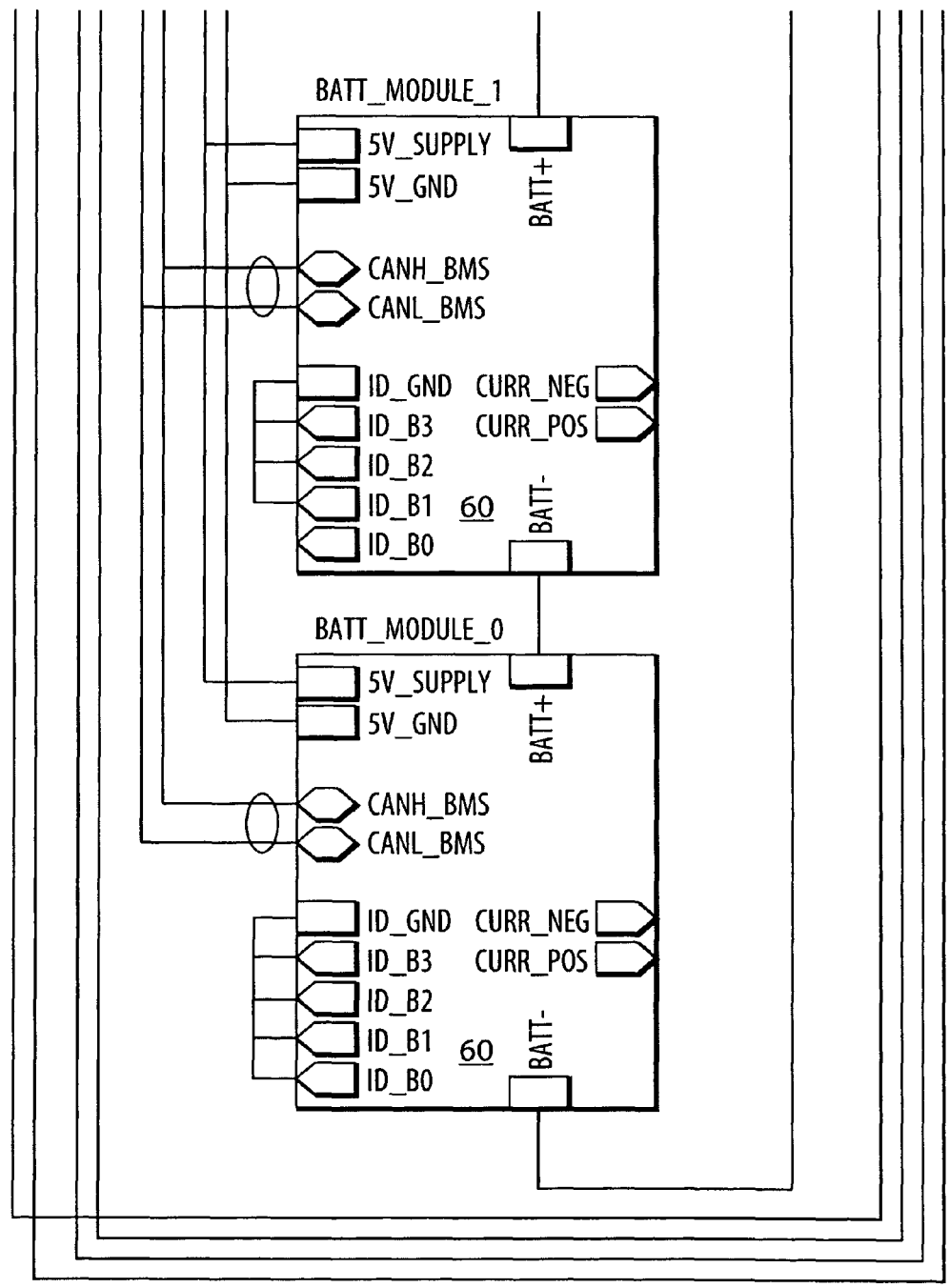
FIG.13 (vi)

ENERGY STORAGE MODULE

CROSS-REFERENCE TO RELATED APPLICATIONS

This application claims the benefit of U.S. Provisional Application No. 61/028,165, filed Feb. 12, 2008, the contents of which are included herein in their entirety by reference.

FIELD OF INVENTION

The present invention relates to energy storage systems, in particular, for vehicles, and particularly to battery storage systems that include modular battery components.

BACKGROUND OF THE INVENTION

Motor vehicle applications subject battery systems to harsh mechanical conditions. Mechanical stresses are caused by widely varying temperatures caused by ambient temperature fluctuations and varying internal heat generation. In addition, vehicles can subject battery systems to continuous and long-term vibrations that degrade efficiency. In addition, performance and reliability demands are extremely high while cost and mechanical constraints are generally very tight. For example, demanding applications for vehicle battery systems, such as hybrid and electric vehicles, require long life, high power output, as well as temperature and vibration tolerance. In light of these design constraints, it is often difficult to design mechanical packaging systems that function reliably.

It is believed that existing battery system designs do not minimize or address numerous points of failure. Large battery storage systems, such as used in electric vehicles and hybrid vehicles, generally include many separate battery cells to store sufficient power. In some systems, it is convenient to assemble the cells into packs of many cells that are then combined in a suitable number into a battery module that provides the total capacity for the system. It is believed, however, that many interconnections are required to assemble the cells and that each interconnection provides a failure point in the system.

The charging and discharging of battery storage systems is generally managed to maximize the life spans of all the cells. Proper power management is aided by a battery management controller which measures the voltages of the battery cells or groups of cells. Voltage measurement of many cells presents problems in terms of accuracy and the practical interconnections between the cells and the controller. For example, connections used to measure voltage can imbalance the discharge rates of cells and adversely affect the voltage measurements provided. Problems also arise when cells are interconnected in series, which poses a risk of overcharging. Overcharging can negatively affect the cell lifespan.

BRIEF SUMMARY OF THE INVENTION

The invention regards a battery assembly that mechanically and electrically connects multiple rechargeable batteries to form a larger battery unit. Batteries are connected in series to form rows and columns of battery cells into packs that combine the energy of multiple batteries. The battery cells are joined together to form columns of cells connected mechanically together by an exterior connection sleeve, and mechanically and electrically connected together by a conductive epoxy joining the end of one cell to the end of an adjacent cell in series. The epoxy is preferably a silver-infused epoxy. The columns of cells are mounted and held in place by racks, with bolts passing through the racks to form a sandwich structure that secures the position and orientation of the cells and columns, and that maintains the electrical connection between joined cells. Bus bars at the end of the columns of each rack are joined together to electrically connect the columns to each other, and to provide two terminals of the pack through which power is supplied to and from the cells. Perpendicularly disposed to the direction of the columns are a series of conductive bands that join adjacent cells together along rows of cells.

Each pack is provided with a circuit and sensors that monitor the voltage, current, and temperature of the cells, rows, columns, and pack, and that reports the acquired data to a control unit that monitors the power levels in the packs. When voltage, current, and temperature data indicate that power levels between cells, rows, and columns are out of balance, a signal is provided that initiates a cell equalization function that bleeds energy from overcharged portions of the pack to resistors until the power levels between rows, columns, and cells are equalized.

Also provided is a mechanical structure for a battery power source that addresses the need for durability by firmly bonding cells into monolithic packs such that the cells limit movement significantly with respect to one another. Battery cells are assembled, using conductive epoxy and insulating adhesive, to form durable structural elements that are assembled into modules to form a voltage source. The bonded structure of the packs enables the packs to withstand the high vibration levels experience in a motor vehicle. In a preferred embodiment, a balancing network is provided in an off-board controller that facilitates the replacement of individual battery packs. The balancing network is preferably provided on a printed circuit board in the off-board controller.

Also provided is a device that allows accurate voltage measurement of cells and/or subsets of cells, in a single electronic component that is connected to the cell packs by a wiring harness. The electronic component includes a network of resistors that balance the leakage of current in the cells. At least some of the pack terminals are connected through a wiring harness to a control unit so that each of the pack terminals is connected to a portion of a resistor network in the control unit. The resistor network resistively connects some of the pack terminals in series to create a balancing current between pack terminals.

A method is provided to control the charging cycle of the power storage device to minimize over or under charging and extend battery cell life. The system is able to control the charging of any subset of cells in the battery pack from the module level down to the cell level. This method involves applying a charging voltage across the terminals of one or more cells and switching a short-circuit across the terminals of the one or more cells in response to an indication of an overcharge condition. The indication may be received at the controller and identified in various different ways. For example, a state of charge of a battery may be predicted based on a series of charge and/or discharge currents to and/or from a battery over a period of time and stored in a memory to derive the indication. In a variation, the state of charge of a battery may be based on a series of charge and/or discharge currents to and/or from a battery over a period of time and stored in a memory and refining a prediction resulting from the predicting to derive the indication based on a discharge curve that is representative of the type of cell used.

Although the preferred embodiments are utilized in a vehicle, which includes any structure that can move by a power source relative a fixed location, the preferred embodiments of the invention can be utilized in stationary power storage and generation devices, and in particular, non-mobile energy storage systems. Thus, one of ordinary skill in the art would understand that the detailed description below can be applied for use in non-mobile systems and devices in place of the preferred embodiment of a vehicle.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention. Where appropriate, features similar between drawings and between the embodiments illustrated in the drawings are not identified again.

DETAILED DESCRIPTION

Figure 1:
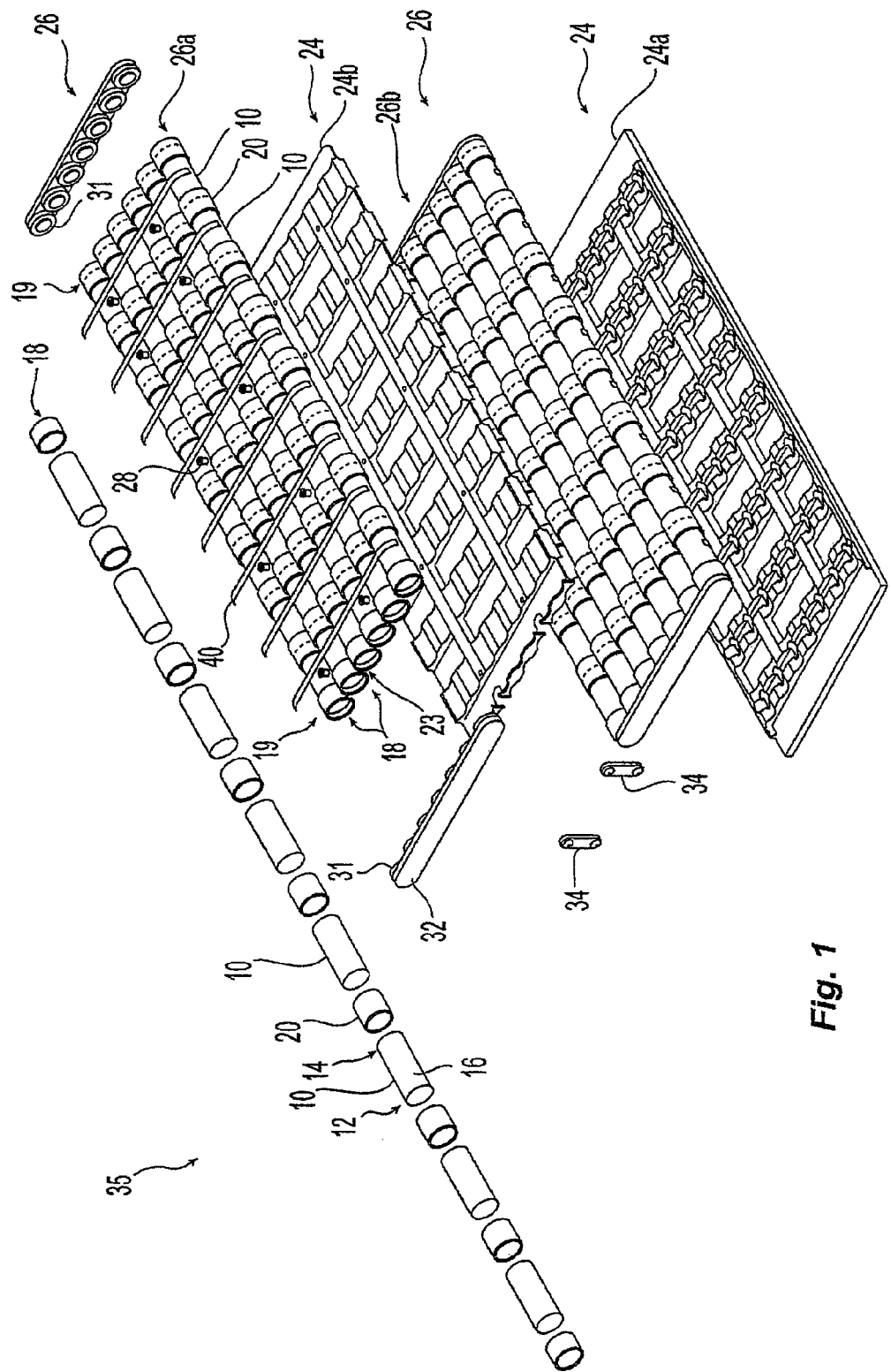
FIG. 1 illustrates an exploded isometric view of a portion of an exemplary battery pack assembly.
Figure 3:
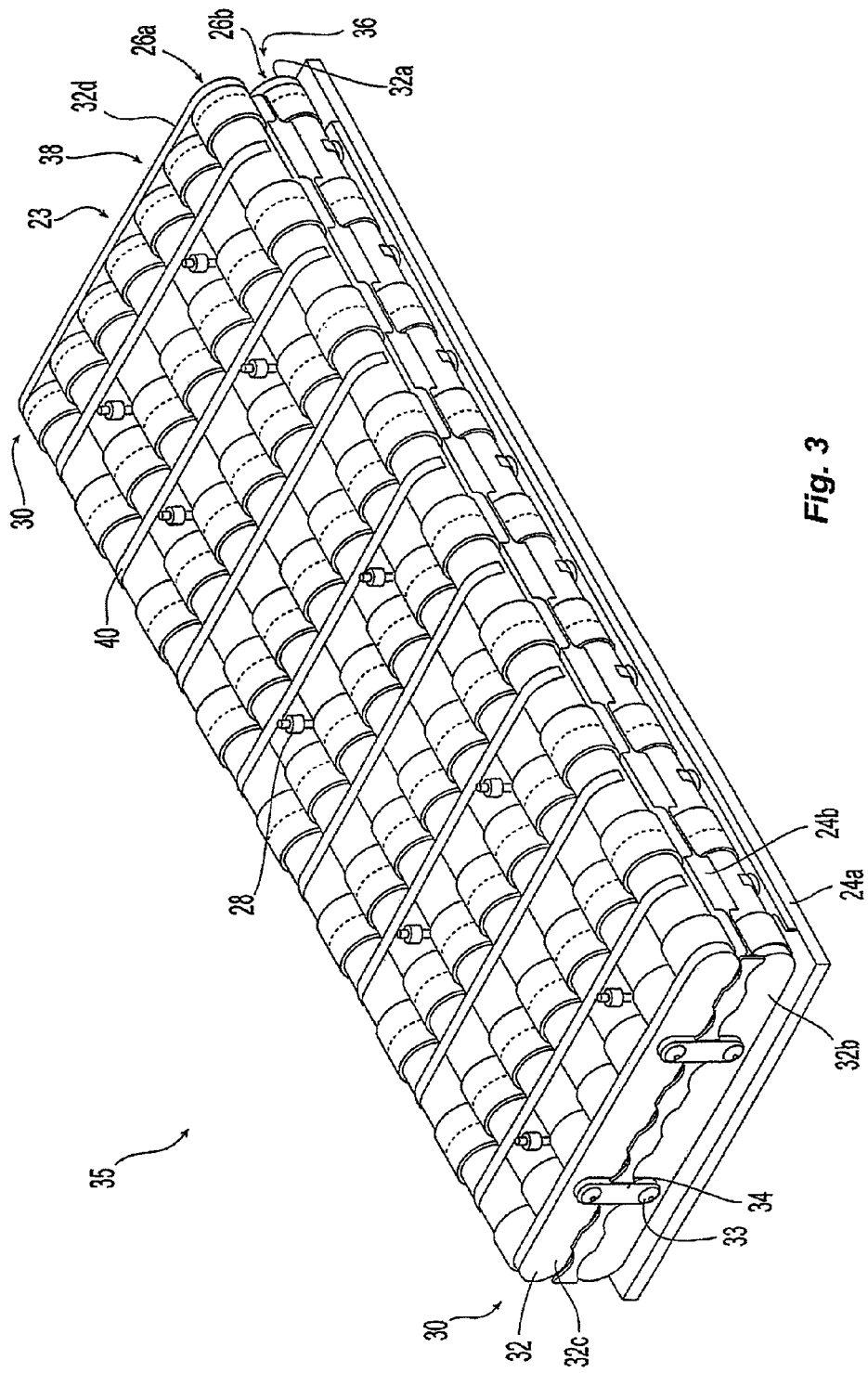
FIGS. 3-4 illustrate assembled isometric views of the battery pack assembly of FIG. 1.
Figure 4:
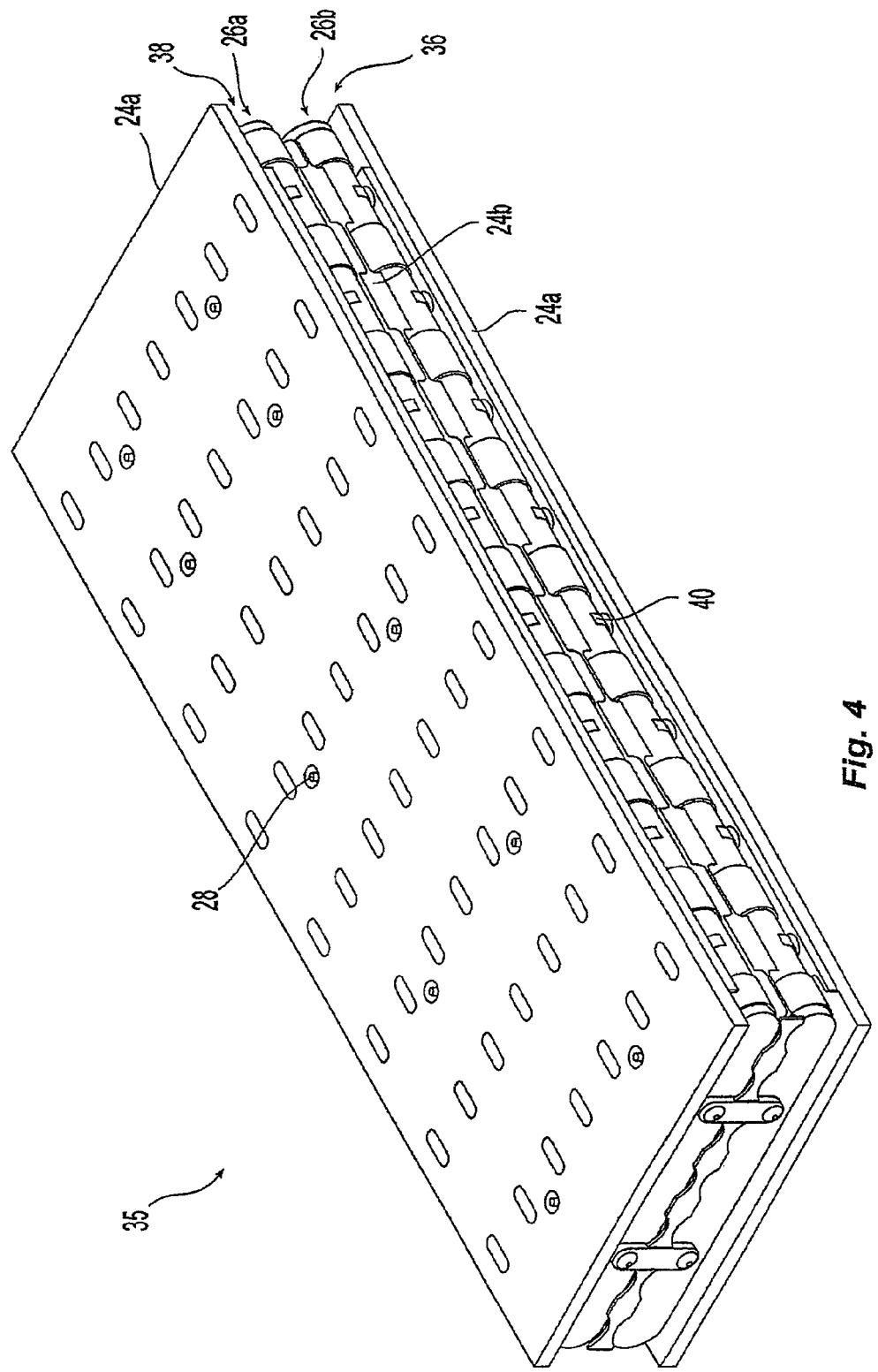

FIG. 1 illustrates an exploded view of a portion of a pack 35. FIG. 3 illustrates the pack 35 of FIG. 1 in assembled form. FIG. 4 illustrates a fully-assembled pack 35.

The pack 35 includes several cylindrical battery cells 10 each having ends 12 and 14. The cell 10 is preferably a rechargeable battery, and more preferably a spiral-wound Lithium-ion (Li-Ion) or a Nickel metal hydride cell. Most preferably, the cell 10 is a Model 26650 cell sold by A123Systems of Watertown, Mass., USA. The cell 10 is preferably rated for a DC voltage of 1.1-4.2 volts, more preferably rated for a DC voltage of 1.1-1.7 volts for nickel-metal hydride cells and 3.0-4.2 for lithium-ion cells, and most preferably rated for a DC voltage of approximately 1.2 volts for nickel-metal hydride cells and approximately 3.2 volts for lithium-ion cells. The cell 10 has an outer casing 16 and, preferably, ends 12, 14 that each include one of a positive terminal and a negative terminal of the cell 10. The outer casing 16 can also have a terminal or be electrically connected to the positive or negative terminal of the cell 10.

Figure 2:
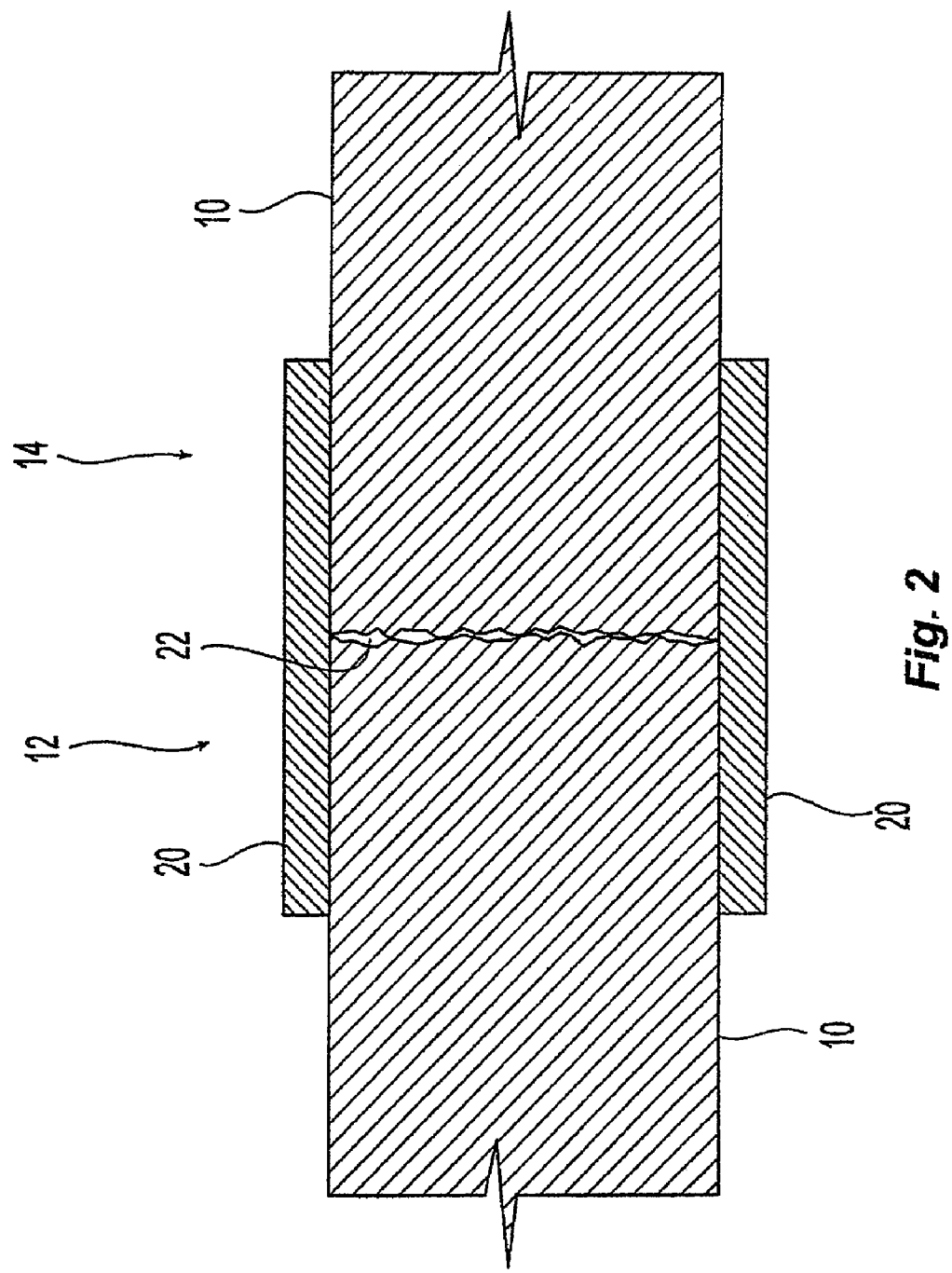
FIG. 2 illustrates a cross-sectional view of a portion of two adjoining cells of the battery pack assembly of FIG. 1.

In the pack 35, several cells 10 are aligned so that the positive terminal at the end 12 or 14 of one cell 10 is disposed to face the negative terminal at the end 12 or 14 of an adjacent cell 10, to form a column 18 of cells 10 connected to each other in series. The column 18 also includes a connection 20 between adjacent cells 10 that provides a mechanical connection between adjacent cells, and that facilitates an electrical connection between the facing terminals of adjacent cells. Connection 20 provides a mechanical connection by securing a portion of the casing 16 at an end 12 or 14 of one cell to of portion of the casing 16 at an end 12 or 14 of an adjacent cell 10. The connection 20 mechanically secures one cell 10 to another by a friction fit achieved when the connection 20 is wrapped around the opposing ends 12, 14 of adjacent cells 10. The connection 20 is preferably a polymer, and more preferably a polyolefin tube with a shrink wrap characteristic that constricts the ends 12, 14 of the cells 10 to secure adjacent cells together. The connection 20 also preferably has a heat-reactive adhesive lining on the interior of the connection 20 to facilitate bonding with cells 10.

Where the end 12, 14 of one cell 10 abuts the end 12, 14 of an adjacent cell 10, the two adjacent cells contact each other to form an electrical connection between adjacent cells 10. FIG. 2 illustrates a cross-sectional view of two abutting ends 12 and 14 and connection 20, with the mating surfaces of ends 12 and 14 exaggerated to show surface irregularities causing intermittent contact between the mating surfaces of ends 12 and 14 over the surfaces of the ends. Distributed on and between the abutting ends 12, 14 is preferably a compound 22 that further adheres adjacent cells 10 together and that further assists with the electrical connection between cells. The compound 22 maintains flexibility in the bond between adjacent cells 10, and possesses thermal expansion properties that maintain the mechanical and electrical connection between adjacent cells when the column 18 is exposed to vibrational or thermal stresses. The compound 22 is preferably an epoxy containing a conductive material distributed within the epoxy, and more preferably a silver-impregnated conductive epoxy. The compound 22 is most preferably a pure silver filled electrically-conductive epoxy that is flexible at an operating temperature of between −30° C. and +75° C. The epoxy also preferably has the ability to maintain its form and maintain an electrical connection between cells when subjected to vibration and heat. In an alternative design, the ends 12, 14 can have projections or buttons extending from the ends 12 or 14 that engage the end of an opposing cell 10, or engage projections or buttons extending from an opposing cell 10. These connections can be connected by either welding or an epoxy, or by suitable fixation technique. The projections or button on the ends 12, 14 provide a greater surface area to the ends 12, 14 to further facilitate the mechanical and electrical connection achieved with the compound 22.

Multiple cells 10 can be formed into columns 18, with each column 18 placed parallel next to another column 18. A rack 24 supports and aligns each column 18 to form a layer 26 of columns 18 that are maintained at a spacing 23 from each other. Rack 24 can be formed to provide support to a layer 26 on one side of the rack (rack 24a) or to provide support to a layer 26 on each side of the rack (rack 24b). Bolts 28 are provided to secure multiple racks 24 together and fix the position of the columns 18 between the sandwiched racks 24 and to maintain the layer 26 arrangement of the columns 18. The racks 24 provide electrical insulation between adjacent columns 18 by maintaining the spacing 23. Rack 24b provides electrical insulation between an upper layer 26a on one side of rack 24b and lower layer 26b on the other side of rack 24b. Racks 24a provides electrical insulation to the exterior environment surrounding the cells 10. An insulation layer (not shown) is also preferably placed between each column 18 and rack 24 to provide addition electrical insulation, shock absorption, and vibrational dampening. Preferably, the insulation layer is made of a silicone adhesive applied between the columns 18 and racks 24 when assembled. The insulation layer can be applied intermittently between mating columns 18 and racks 24 or as a complete and continuous layer.

Each column 18 has ends 19, and the series connection between the cells 10 of a column 18 forms a terminal 30 at each end 19 of each column 18. The terminals 30 at one end of a layer 26 are joined together with a bus bar 32 that mechanically and electrically engages the terminals together. Bus bar 32a joins the ends 19 at one end of the lower layer 26b, bus bar 32b joins the ends 19 at the other end of lower layer 26b, bus bar 32c joins the ends 19 at one end of the upper layer 26a, and bus bar 32d joins the ends 19 at the other end of upper layer 26a. Bus bar 32 is preferably a copper bar affixed to the end 19 of the column 18. More preferably, the bus bar 32 is retained to the ends 19 of the columns 18 by a series of bus bar connections 31 extending from the bus bars 32 to engage the connections 20 extending from the ends 19 of the columns 18.

Bus bar 32b is connected mechanically and electrically to bus bar 32c by a bridge 34. Bridge 34 is preferably a copper bar affixed to bus bars 32b and 32c at each end, and more preferably engaging each bus bar 32b, 32c with a copper screw 33 passing through the bridge 34 to join it to the bus bar 32b, 32c. Alternatively, the bridge 34 can be omitted and the bus bar 32b and bus bar 32c can be replaced by a unitary bus bar joining upper layer 26a to lower layer 26b.

Figure 5:
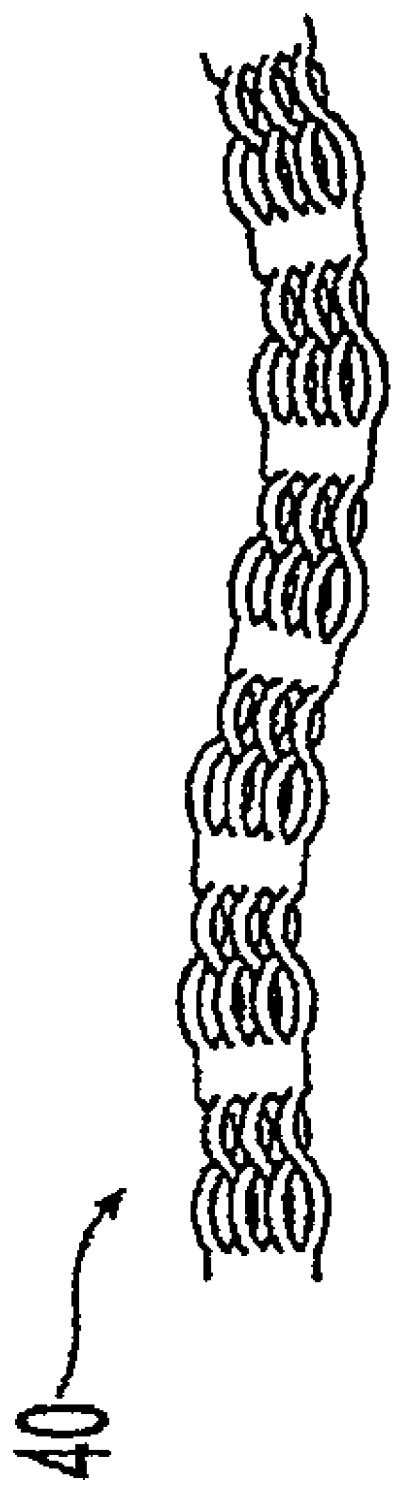
FIG. 5 illustrates a portion of a band component of the battery pack assembly of FIG. 1.

There is an electrical connection between the cells 10 and bus bars 32 of the pack 35. At one end of the assembly forming pack 35 is the bus bar 32a which provides a terminal 36 that can be positive or negative in charge, and the bus bar 32d provides a terminal 38 that has a charge that is the opposite of that at terminal 36. Also, a series of bands 40 are wrapped partially on the casing 16 of a cell 10 that extend in a direction perpendicular to the longitudinal direction defined by the columns 18, to define rows of cells 10. The bands 40 electrically connect together the casings 16 of cells 10 disposed at approximately the same distance from the bus bar 32 located at either end of the layer 26. The electrical connection provided by each band 40 across the columns 18 of a layer 26 serve to equalize the charge existing in each of the cells 10 connected to a common band 40 in a row. The band 40 is preferably a conductive ribbon, and more preferably a Ni-Chrome strip. The band 40 can also be a perforated metal strip as illustrated in FIG. 5. The band 40 is preferably affixed to the casings 16 by a weld, soldering, or an adhesive, and more preferably affixed with a silver-filed conductive epoxy adhesive. Alternatively, the bands 40 can extend entirely around the layer 26 in a wrap. In another alternative, the bands 40 can be substituted by a modification of casing 16 in which a conductive tab extends from the casing 16 of each cell 10 in a direction and distance that allows the end of the tab to be affixed to or connected to the casing 16 of a cell 10 in an adjacent column 18. In still another alternative, the bands 40 can be omitted from the pack 35 and, instead, the connections 20 of each adjacent column 18 be formed as a single connection joining the ends of cells 10 in two directions; a first direction longitudinal to the columns 18, and a second direction orthogonal to the columns 18.

The pack 35 can have a total of 112 cells 10 arranged in an array with two layers 26, with each layer 26 having seven columns 18, and each column 18 having eight cells 10 which form eight rows, as illustrated in FIGS. 1 and 3-4. The pack 35 can include arrays with different or varying quantities of cells 10, rows, columns 18, and layers 26. For example, the pack 35 can be assembled to have 112 cells 10 arranged in an array of four layers, with each layer having seven columns, and each column having four cells and defining four rows. In another alternative, the pack 35 can be arranged so that the columns 18 of adjacent layers 26 are offset relative to each other so that the columns 18 of one layer can nest within the spaces between the columns 18 of the other layer, forming a honeycomb structure in the cross-section.

Figure 6:
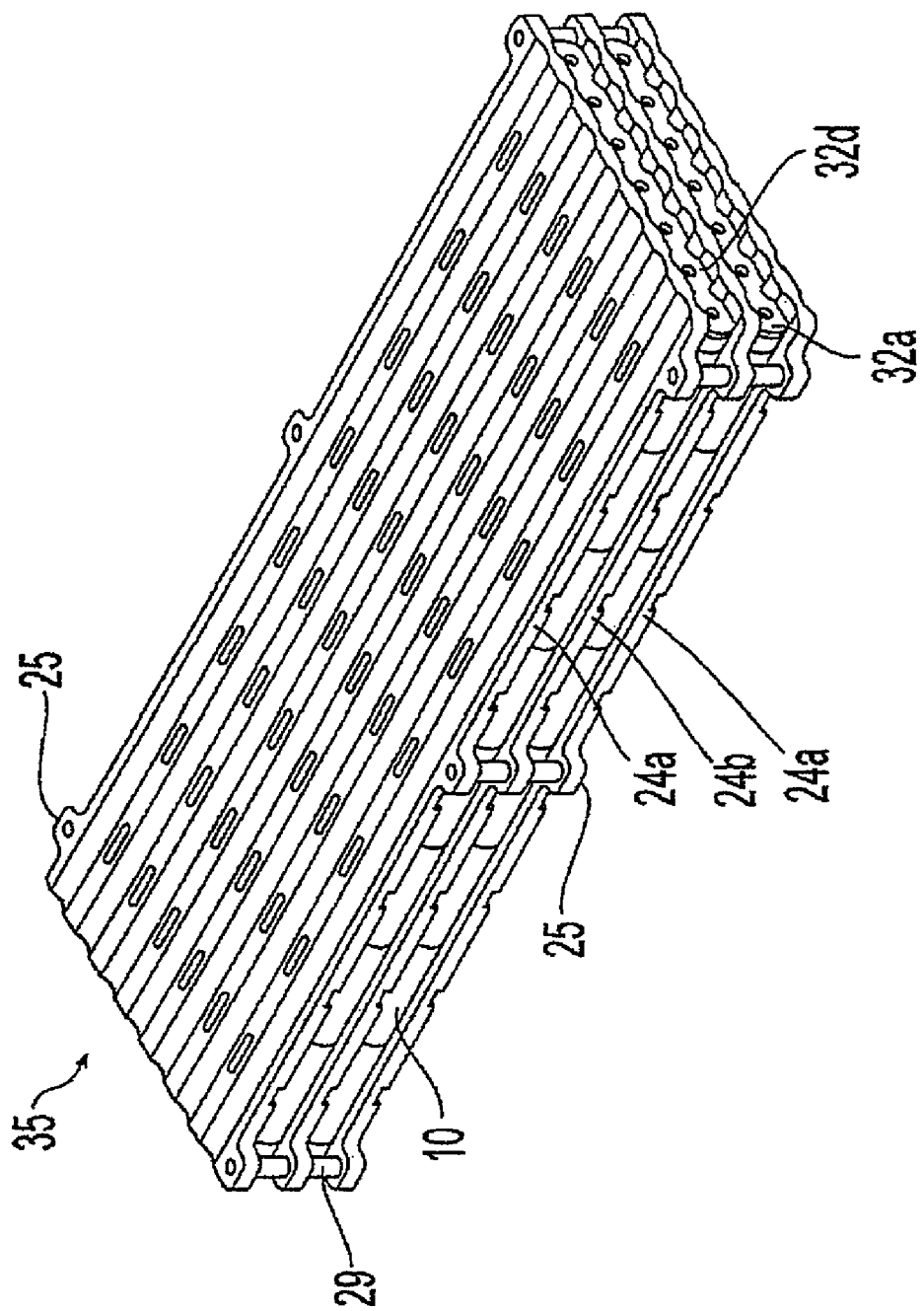
FIG. 6 illustrates an alternative exemplary battery pack assembly.
Figure 7:
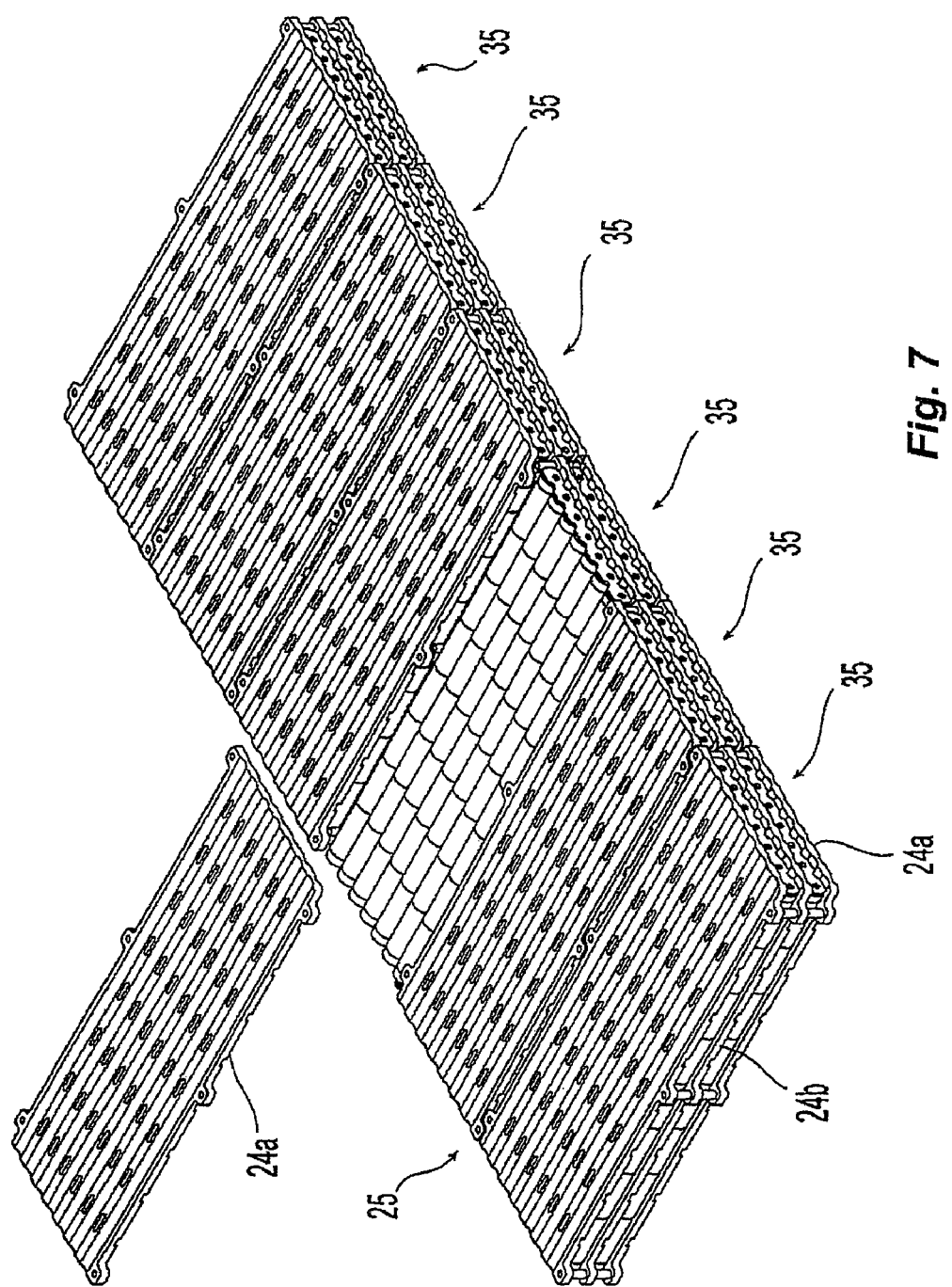
FIG. 7 illustrates multiple battery pack assemblies of FIG. 6.

In another alternative design of pack 35, bolts 29 can extend through bosses 25 to join the layers 26 and racks 24 together at the periphery of racks 24. The bosses 25 extend from the sides of the racks 24 to provide mounting areas that hold and guide bolts 29. Bolts 29 on one side of the pack 35 can be offset from the bosses 25 and bolts 29 on the other side of the pack 35 so that packs can be positioned adjacent to each other more closely than achieved when the bosses 25 and bolts 29 are not offset relative to each other. FIGS. 6 and 7 illustrate an example of offset bosses. Alternatively, any suitable fixation device can be used in place of the bolts 29, such as an interlocking clip with mating components mounted on different racks 24, or a tab extending from one rack that is inserted into a receiving portion of another rack.

Figure 8:
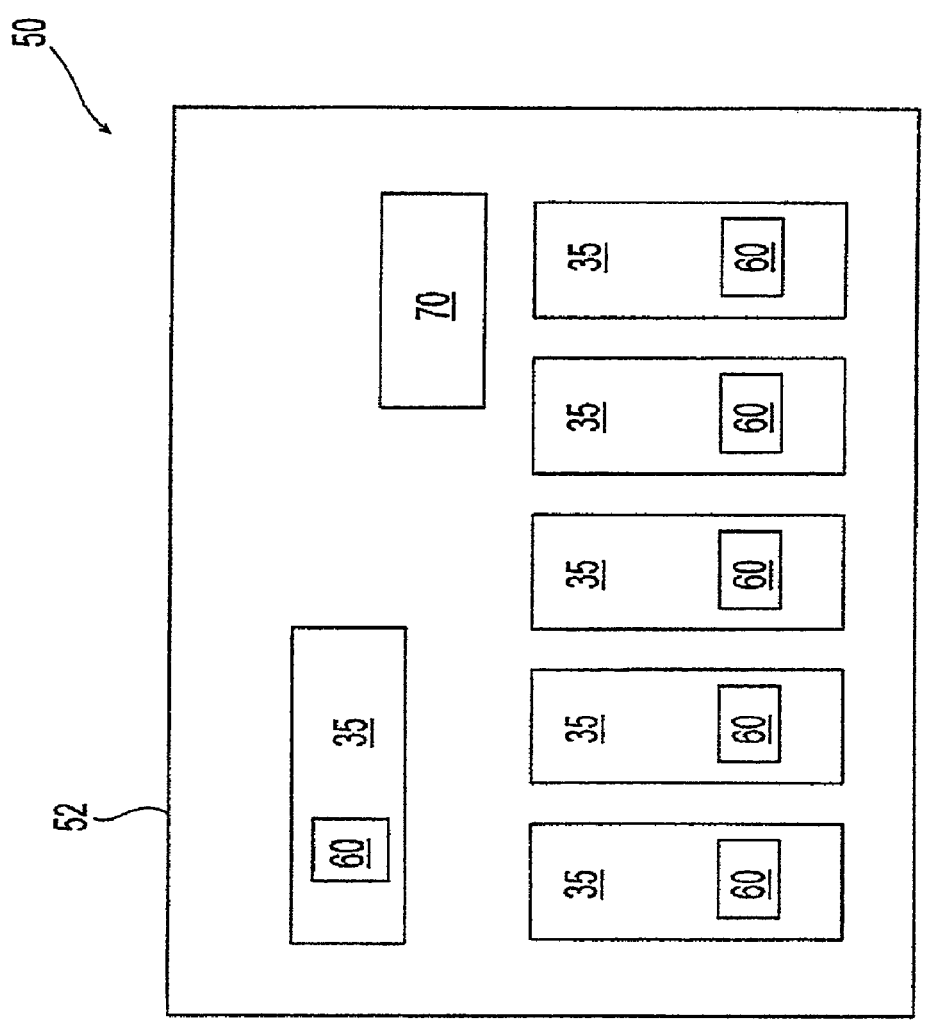
FIG. 8 schematically illustrates an exemplary energy system assembly.
Figure 9:
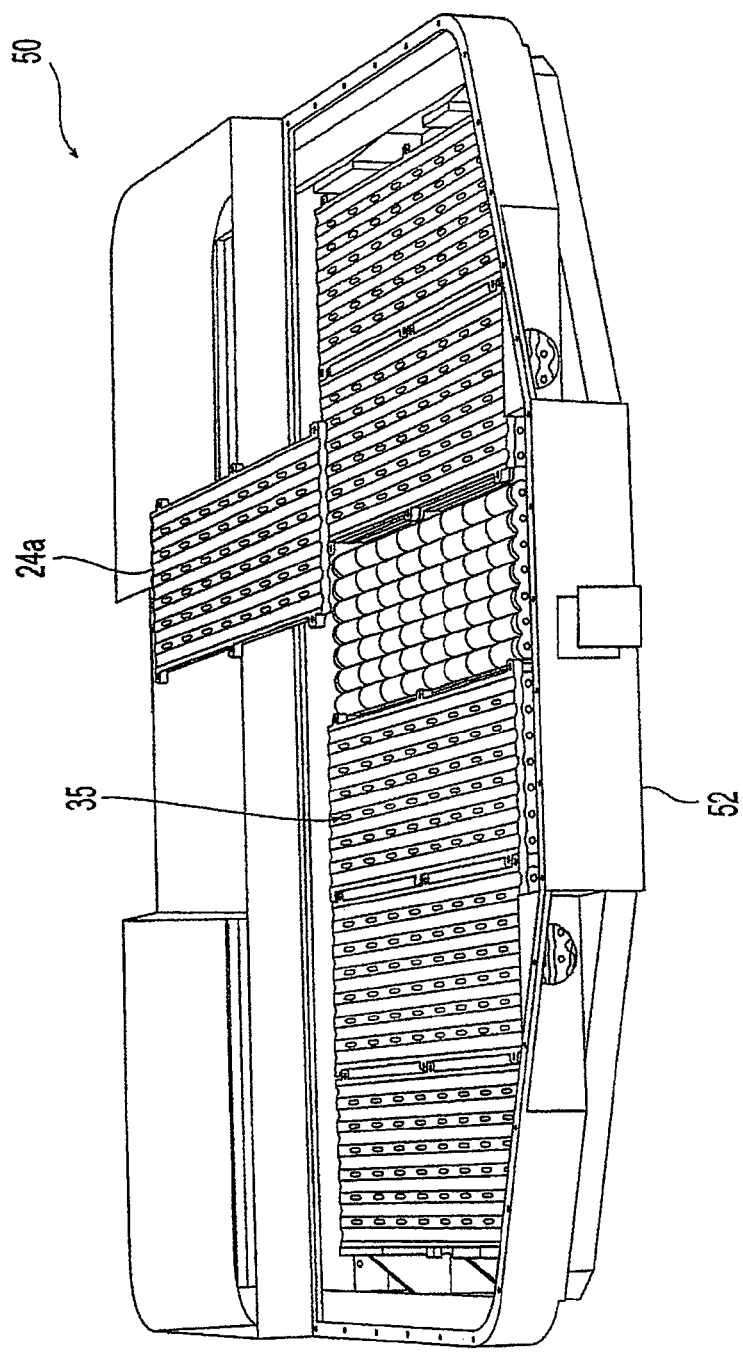
FIG. 9 illustrates an alternative exemplary energy system assembly.

The packs 35 can be arranged as a component in an energy storage system 50 contained within a frame 52. The energy storage system 50 illustrated in FIG. 8 includes six packs 35, a Voltage Temperature and Current Monitoring Module (VTIM) 60 for each pack 35, and a Battery Management Unit (BMU) 70 connected to the six VTIMs 60. Various VTIM and BMU arrangements are contemplated, depending on the power requirements for the energy storage system 50, and the voltage and packaging requirements of the devices connected to the system 50. FIG. 9 illustrates an alternative arrangement of packs 35 in the frame 52 of the system 50, with one of the racks 24a removed to reveal the position of the cells 10.

Each pack 35 is preferably associated with a single VTIM 60, but a single VTIM 60 can be associated with more than one pack 35. The VTIM 60 is preferably mounted on to the exterior of the pack 35 and provided with connections (not shown in FIG. 8) that facilitate the removal or replacement of a pack 35 in the frame 52.

The VTIM 60 is connected to a pack 35 to provide monitoring of the cells 10, columns, or rows in the pack 35, and to provide a system to balance the state of charge between individual cells 10, columns 18, or rows of the pack 35. By balancing the distribution of energy, and in particular voltage, between cells 10, rows, and columns 18, the energy available in the pack 35 can be more efficiently distributed to systems connected to the energy storage system 50, and it is believed that the anticipated life of the pack can be greatly extended as compared to systems that are not able to provide active state-of-charge balancing.

Figure 10:
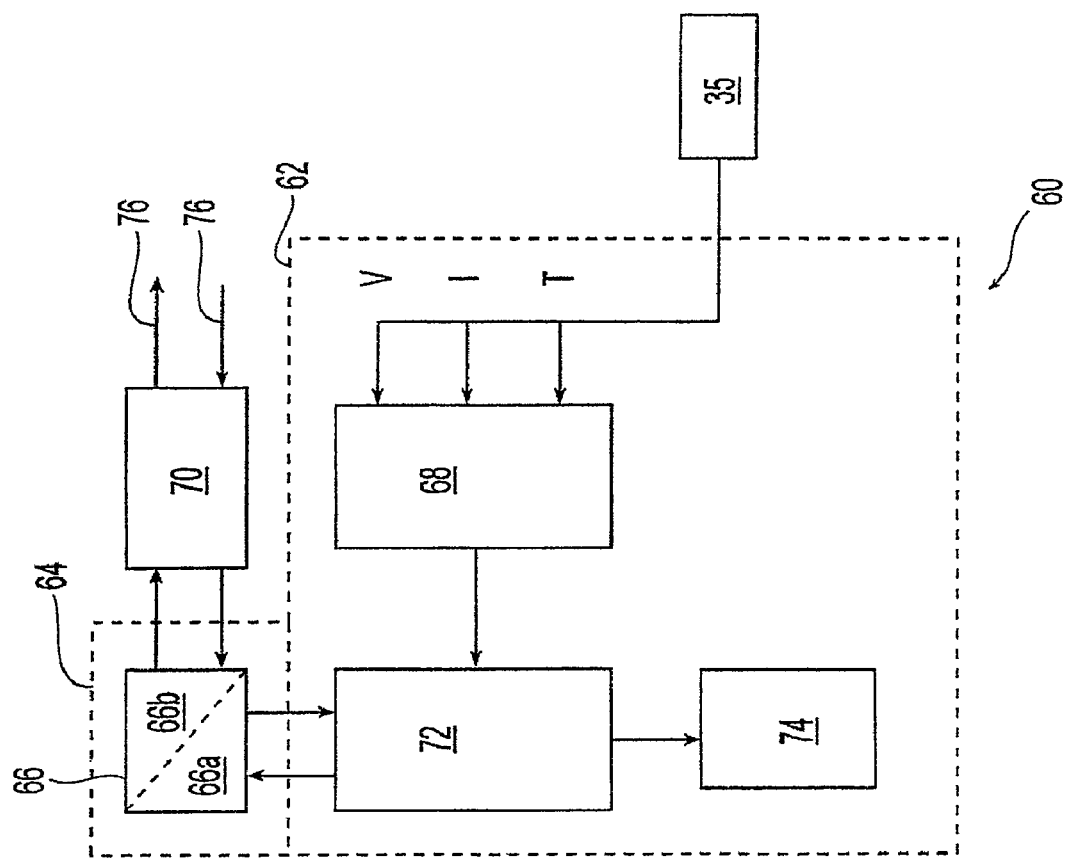
FIG. 10 schematically illustrates a VTIM component of the assemblies of FIGS. 8-9.

Each VTIM 60 defines a high-voltage area 62 and a low-voltage area 64, and an interface 66 that permits communication between the high and low voltage areas 62 and 64, while isolating the high and low areas 62 and 64 from each other. Referring to FIG. 10, the low-voltage area 64 is connected to the electrical system of a vehicle and preferably operating at a lower voltage level typical with existing transportation applications that use a 12-volt or 24-volt battery or power supply provided with the vehicle. The high-voltage area 62 is connected to the packs 35 and preferably operating at the voltage level supplied by the packs 35. The interface 66 functions to electrically isolate the low-voltage area 64 and the vehicle electrical system from the higher voltages in use in the high-voltage area 62. The interface 66 also allows the systems within the high-voltage area 62 to be powered from the packs 35 and not deplete power from the low voltage battery connected to the low-voltage area 64.

The packs 35 are connected to the VTIM 60. The voltages V of each rows of cells connected to band 40 are detected by direct measurement and provided to a signal conditioner 68.

The currents I of the packs 35 are measured by a current sensor, or more preferably a current shunt or Hall Effect transducer, and provided to the signal conditioner 68. The temperature T of the cells 10 is measured with temperature sensors and more preferably with thermistors 69 (shown in FIG. 12) and provided to the signal conditioner 68. The signal conditioner 68 also receives an identifier code to distinguish between VTIMs when more than one VTIM is required in a particular application. The signal conditioner 68, as needed, converts the signals for V, I, and T with a converter or, more preferably, a analog-to-digital converter (not shown).

Figure 11:
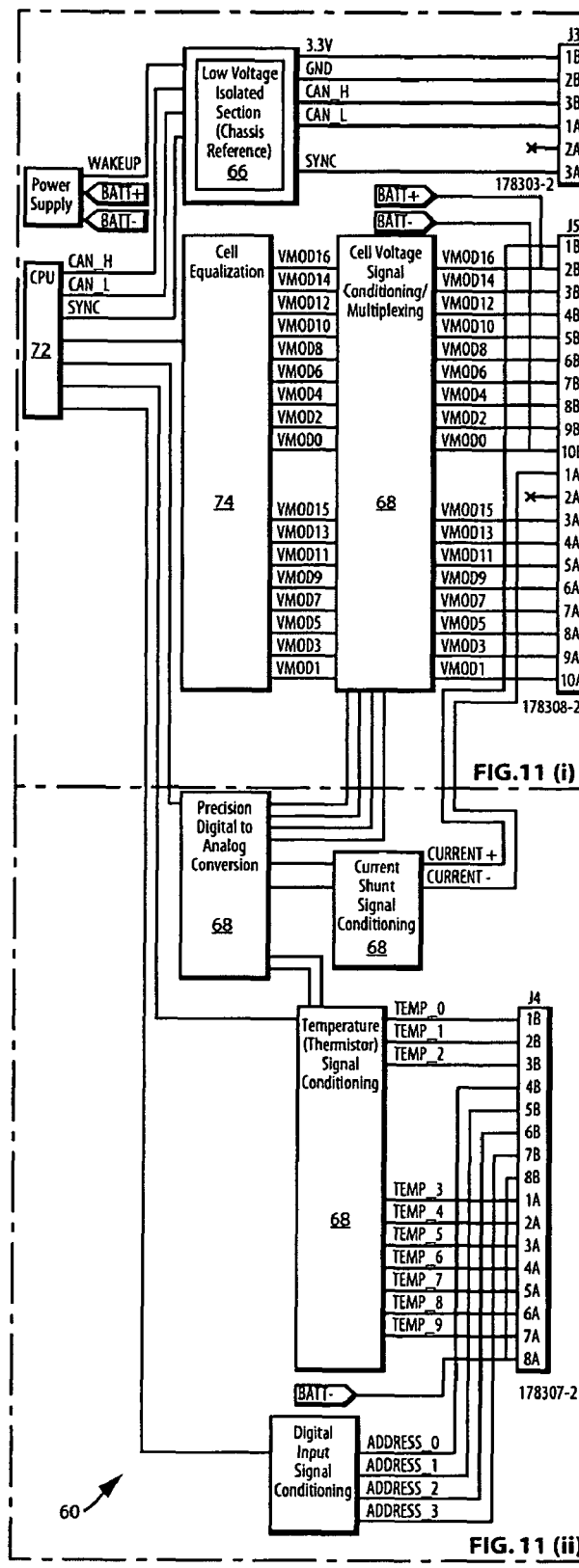
FIGS. 11-13 schematically illustrate components and wiring of the assemblies of FIG. 10.
Figure 11:
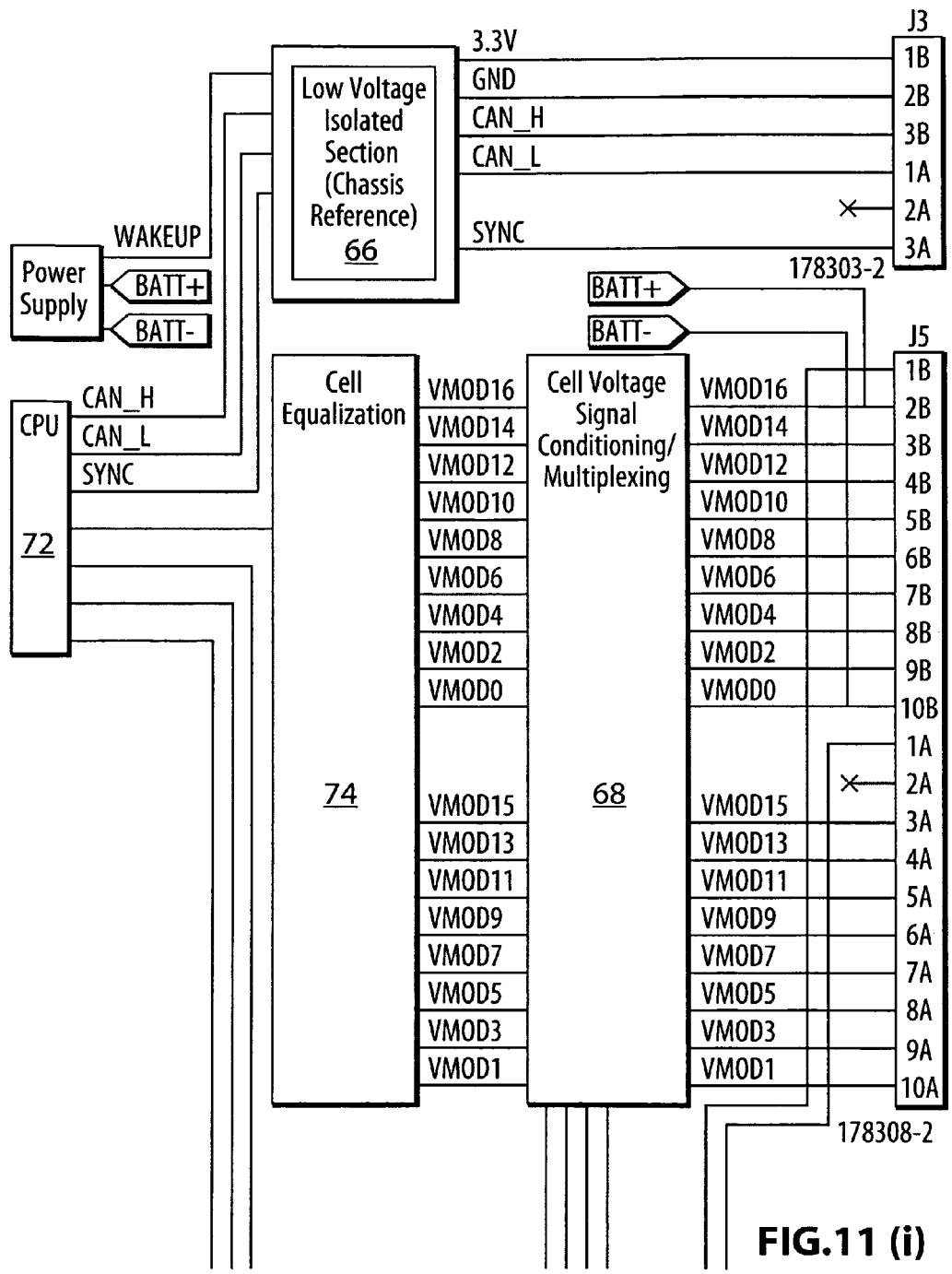
Figure 12:
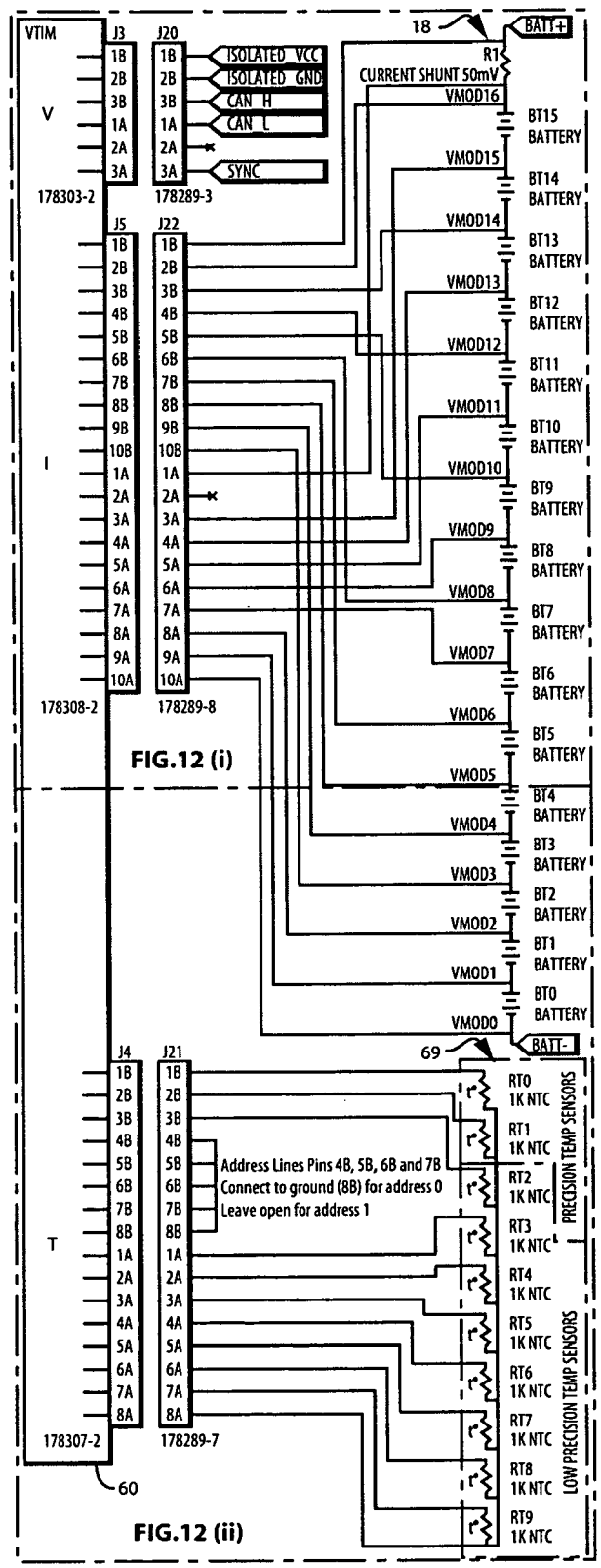
Figure 12:
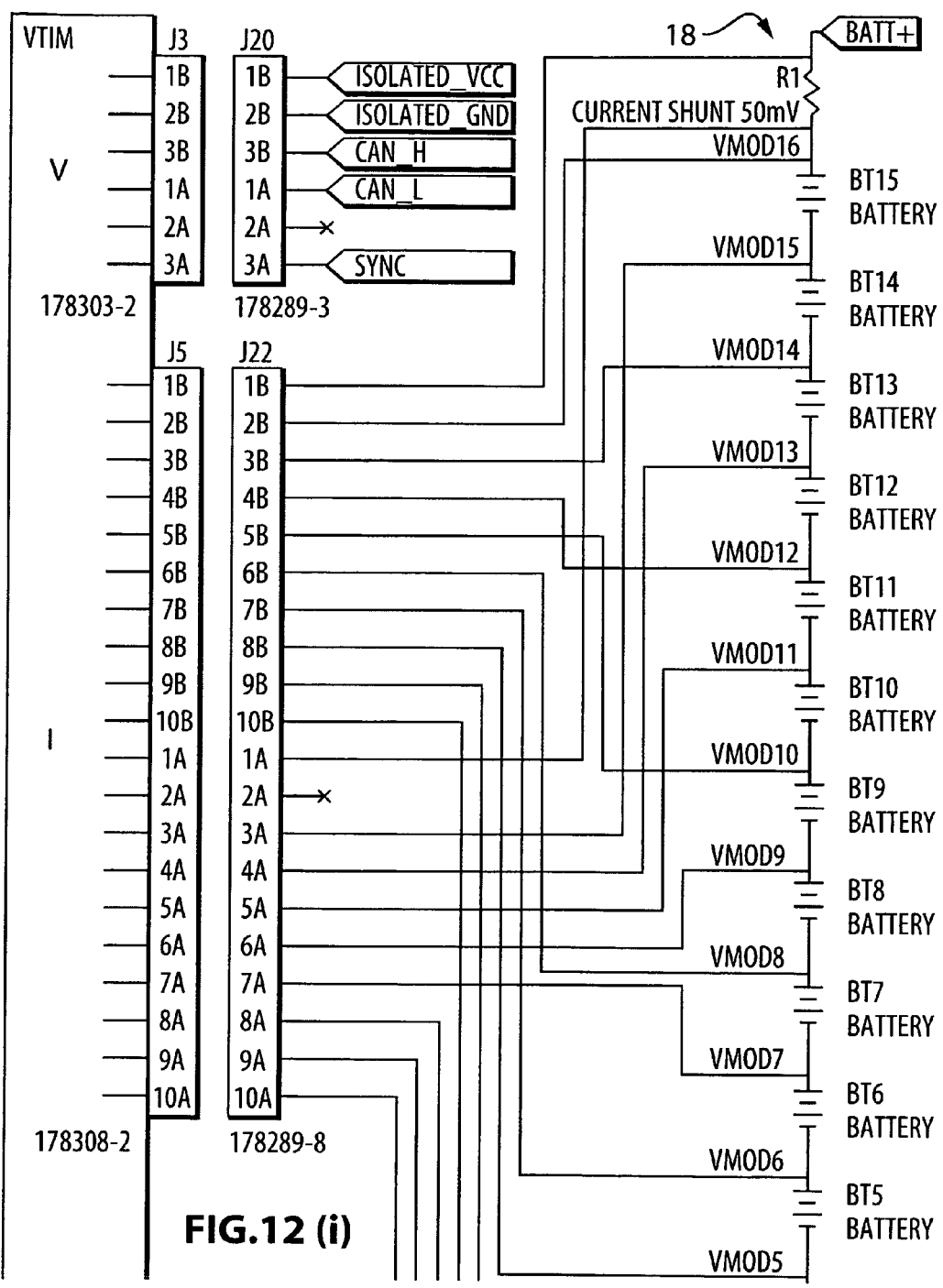

The signals for V, I, and T are provided to a CPU 72 and to a cell equalization circuit 74. The CPU 72 processes the received data and communications with the BMU 70 through the interface 66. The BMU 70 receives the data from the CPU 72 of the VTIM 60 and from other VTIMs 60 forming the energy storage system 50, and additional data from the vehicle via lines 76, and determines (a) whether the packs 35 require equalization to balance the distribution of energy between cells 10, columns 18, and rows of each pack connected to each VTIM, (b) the state of charge of the pack, (c) the maximum allowable power that can be drawn from the pack, (d) the maximum allowable power that can be accepted by the pack under a regenerative braking or charging event, and (e) any pack faults. If cell equalization is determined to be needed for a pack 35, a signal is sent from the BMU 70 to the relevant VTIM 60 through the interface 66 to the CPU 72. The CPU 72 then causes the cell equalization circuit 74 to drain excess current from the cells 10, columns 18, or rows of the pack 35 to equalize the power distributed within the pack 35. Excess power is removed from the pack 35 by discharge through the cell equalization circuit 74 to resistors (not shown), as illustrated in FIG. 10. FIG. 11 illustrates a block diagram further detailing the components of the VTIM 60 and the wiring between components. FIG. 12 illustrates a block diagram further detailing the wiring between a VTIM 60 and the rows and columns 18 of a pack 35 providing values for V and I, the thermistors 69 providing a value for T, and the wiring between the VTIM 60 the pack 35.

The interface 66 has a high-voltage portion 66a and a low-voltage portion 66b, and is preferably a Low Voltage Isolated Section (LVIS) that achieves isolation between the high and low voltage areas 62 and 64 with optical or, more preferably, inductive coupling. Referring to FIG. 10, the low-voltage portion 66b of the interface 66 is connected to the BMU 70 to communicate with the BMU 70 using low voltage, and the high-voltage portion 66a of the interface 66 is connected to the CPU 72 to communicate with the CPU 72 using high voltage.

Figure 13:
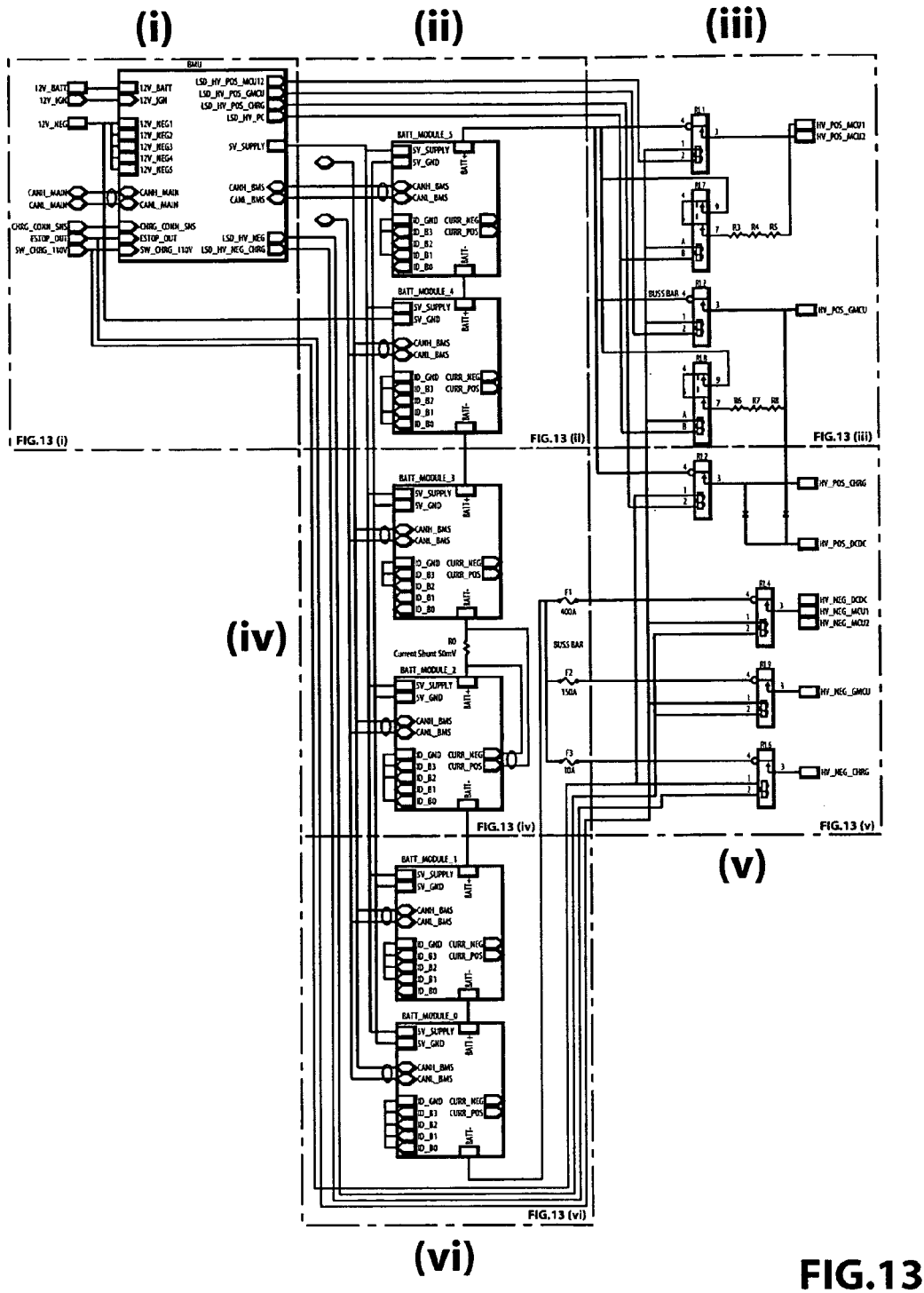
Figure 13:
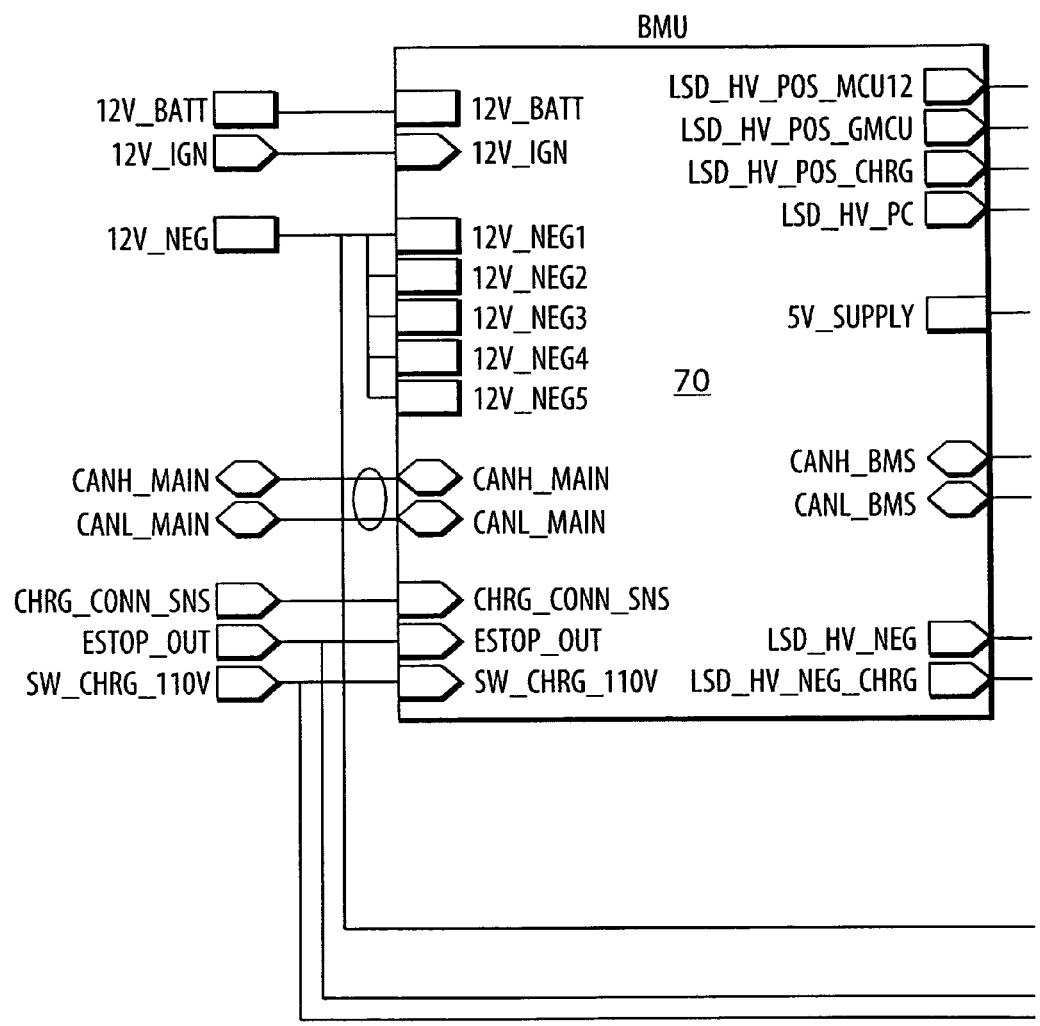
Figure 13:
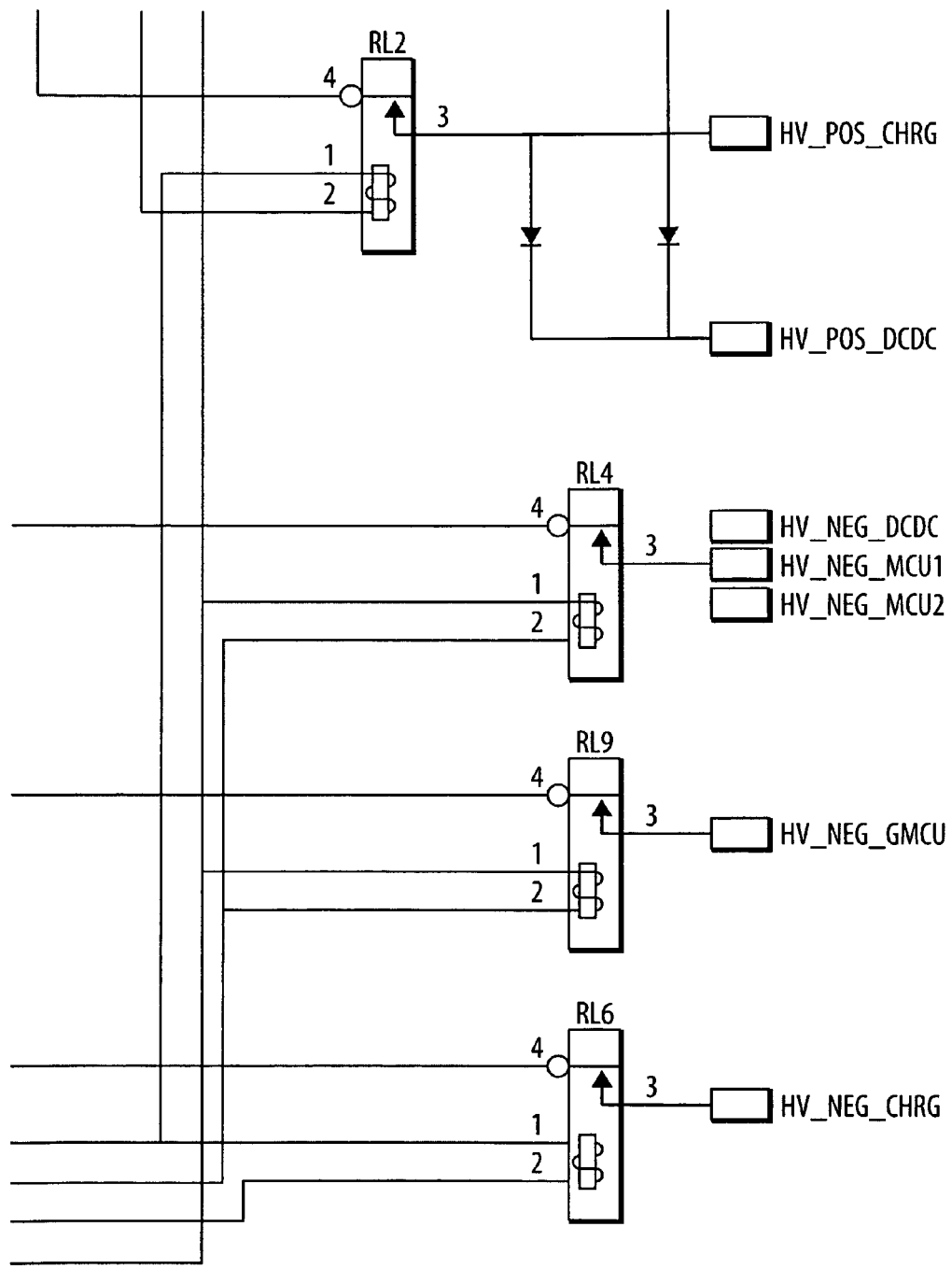
Figure 14:
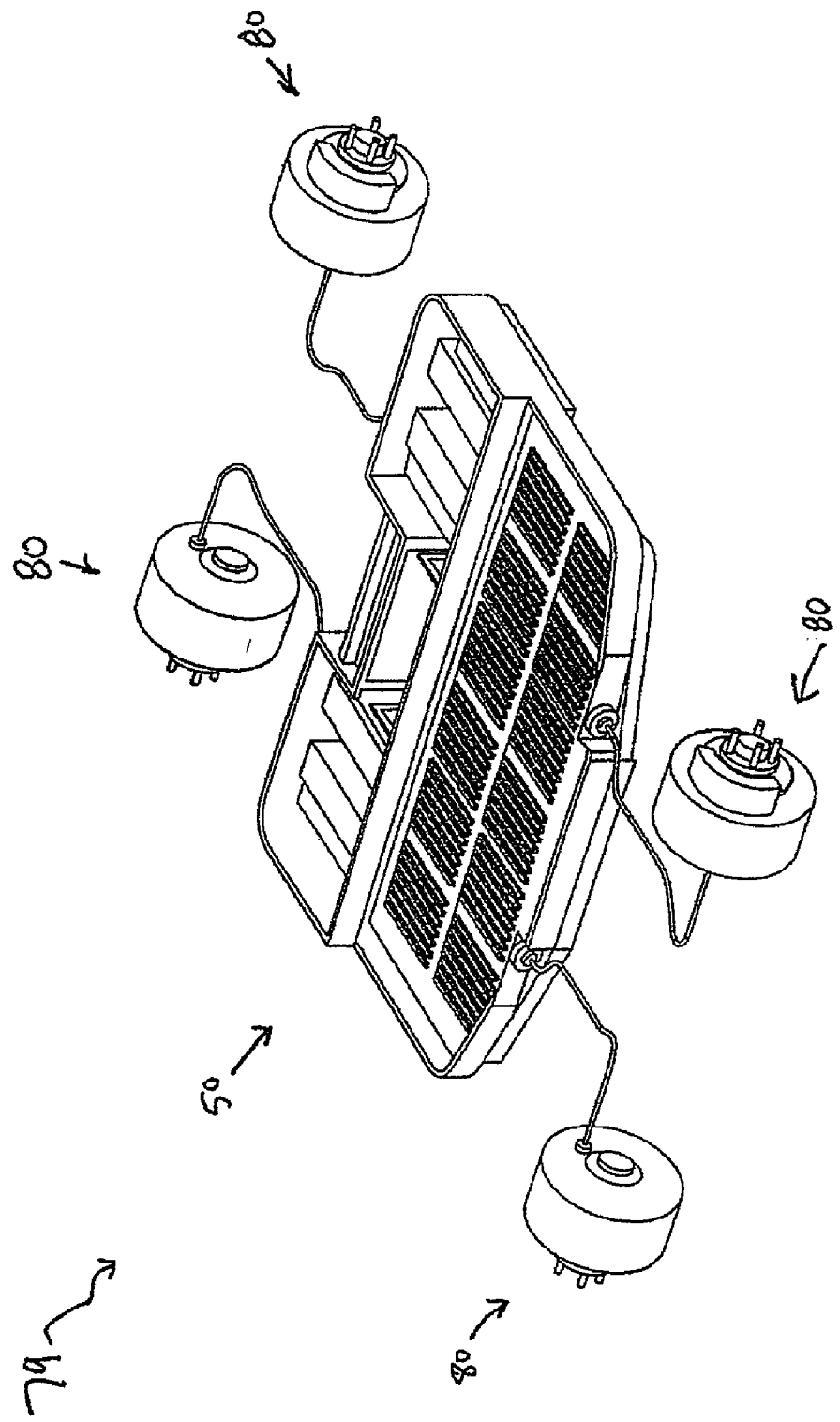
FIG. 14 illustrates an additional embodiment of the exemplary energy system assembly in a vehicle.

The VTIMs 60 of the energy storage system 50 are preferably connected to a single BMU 70 that communicates with the vehicle. FIG. 13 illustrates a block diagram further detailing the connections between the VTIMs 60 and the BMU 70 of the system 50, the components of the system 50, and the wiring between components of the system 50. FIG. 14 illustrates the system 50 in a vehicle 79 with wheel motors 80. The wheel motors 80 can propel the vehicle utilizing power from the energy storage system 50. Alternatively, the wheel motors 80 can be used to generate power that can be provided to the energy storage system 50, such as by regenerative braking. The vehicle 79 can also be a series-type hybrid electric vehicle.

The pack 35 arrangement of cells 10 in the energy storage system 50 provides several advantages over existing power storage systems. The pack 35 arrangement allows for a method and system for arranging cells that were not designed for series connection, or for series connection involving more than ten cells. The system 50 thus advantageously allows for the construction of a pack 35 from lower-cost cells that were not specifically designed for large series-connected applications. The system 50 also provides greater energy output and pack efficiency because power levels are monitored and controlled to keep each cell, column, or row equalized and within a predetermined energy level established for the pack. The system 50 also provides for a lower pack impedance because of the silver epoxy. Also, the energy system provides for a smaller size and lighter weight to the pack because of the increase in battery cell efficiency achieved with the monitoring and control of cell and battery energy differences.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of any claims, and equivalents thereof.

What is claimed:

1. A battery module, comprising:
    a plurality of battery cells arranged in a plurality of columns, each column including a subset of battery cells connected to each other in series, wherein an electrical connection between the subset of connected battery cells is reinforced by an outer sleeve fitted to an outer casing of each battery cell, and a conductive epoxy disposed between facing ends of connected battery cells, each column have a top end and bottom end and providing a terminal at the top end and a terminal at the bottom end;
    a rack for holding the columns, the rack supporting opposing sides of each battery cell and arranging the plurality of battery cells to form defined rows of battery cells;
    a bus bar electrically connecting the terminals at the top ends of the columns and a bus bar electrically connecting the terminals at the bottom ends of the columns; and
    a band electrically connecting said outer casing of each battery cell in each row to equalize the charge existing in each of the cells connected to the band.

2. An energy storage device, comprising:
    a plurality of battery cells arranged in a plurality of columns, each column including a subset of battery cells connected to each other in series to form one of the columns of a battery pack;
    a rack for holding the columns, the rack arranging the plurality of battery cells to form defined rows of battery cells;
    a band electrically connecting an outer casing of each battery cell in each row to equalize the charge existing in each of the cells connected to the band;
    a plurality of sensors providing data regarding the battery pack, said sensors including voltage sensors for detecting the voltage across each row of battery cells, current sensors for determining the current provided by the columns of battery cells, and temperature sensors for detecting temperatures of the battery pack; and
    a monitoring circuit receiving the data from the plurality of sensors, the monitoring circuit including a charge balancing circuit electrically connecting the battery pack to an energy sink for draining energy from portions of the battery pack.

3. The device of claim 2, wherein the energy sink is a switchable resistive load.

* * * * *